(12) United States Patent
Watanabe

(10) Patent No.: US 6,400,838 B2
(45) Date of Patent: *Jun. 4, 2002

(54) PATTERN INSPECTION EQUIPMENT, PATTERN INSPECTION METHOD, AND STORAGE MEDIUM STORING PATTERN INSPECTION PROGRAM

(75) Inventor: Toshiyuki Watanabe, Kanagawa (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,779

(22) Filed: Jul. 27, 1998

(30) Foreign Application Priority Data

Jul. 29, 1997 (JP) ............................................. 9-203304
Nov. 12, 1997 (JP) ............................................. 9-310723

(51) Int. Cl.⁷ ................................................. G06K 9/42
(52) U.S. Cl. ....................................... 382/144; 382/256
(58) Field of Search ................................. 382/144, 145, 382/148, 149, 199, 256–275, 293; 250/559.2, 559.34, 559.36, 559.39, 559.4, 559.45; 348/87, 126; 356/376, 384, 237.4, 237.5; 702/40, 159; 438/16; 430/30

(56) References Cited

U.S. PATENT DOCUMENTS

| | | | | |
|---|---|---|---|---|
| 4,628,531 A | * | 12/1986 | Okamoto et al. ............... | 382/8 |
| 4,633,504 A | * | 12/1986 | Wihl ............................. | 382/54 |
| 4,962,541 A | * | 10/1990 | Doi et al. ...................... | 382/30 |
| 5,179,528 A | * | 1/1993 | Robertson et al. ..... | 364/715.02 |
| 5,204,910 A | * | 4/1993 | Lebeau .......................... | 382/8 |
| 5,475,766 A | * | 12/1995 | Tsuchiya et al. ............. | 382/144 |
| 5,574,800 A | * | 11/1996 | Inoue et al. ................. | 382/149 |
| 5,619,429 A | * | 4/1997 | Aloni et al. ................. | 364/552 |
| 5,795,688 A | * | 8/1998 | Burdorf et al. ................ | 430/30 |
| 5,849,440 A | * | 12/1998 | Lucas et al. .................... | 430/5 |
| 5,850,467 A | * | 12/1998 | Matsui et al. ............... | 382/145 |
| 5,949,918 A | * | 9/1999 | McCaffrey .................. | 382/274 |

\* cited by examiner

Primary Examiner—Leo Boudreau
Assistant Examiner—Brian P. Werner
(74) Attorney, Agent, or Firm—Finnegan, Henderson, Farabow, Garrett & Dunner, L.L.P.

(57) ABSTRACT

Pattern inspection equipment has at least a measured data generation unit for generating measured data from patterns that have been delineated on a sample according to design data, a reference data generation unit for generating reference data used to inspect the patterns from gradational data expressed in multiple gradation levels, and a fault decision circuit for comparing the measured data with the reference data. The reference data generation unit has a multi-valued pattern development circuit for developing the design data into the gradational data and a fine adjustment circuit for finely shifting the positions or adjusting the curvatures of pattern edges in the pattern constructed with the gradational data. The fine adjustment of the pattern edges is necessary to cope with slightly displaced edges and rounded corners of the actual patterns on the sample. These slightly displaced edges and rounded corners are caused through mask manufacturing processes and are frequently smaller than the size of a sensor pixel. To adjust the reference data to the displaced edges, a size modification circuit detects a maximum value in a specified area in the gradational data and modifies the size of the pattern constructed with the gradational data. To adjust the reference data to match with the actual rounded corners, a corner rounding circuit rounds corners in the pattern constructed with the gradational data. Also provided is a pattern inspection method for developing the design data into the gradational data, adjusting the gradational data to displaced edges and rounded corners of the actual patterns and preparing the reference data, and testing the patterns for faults. Further provided is a storage medium for storing a pattern inspection program for realizing the pattern inspection method.

6 Claims, 22 Drawing Sheets

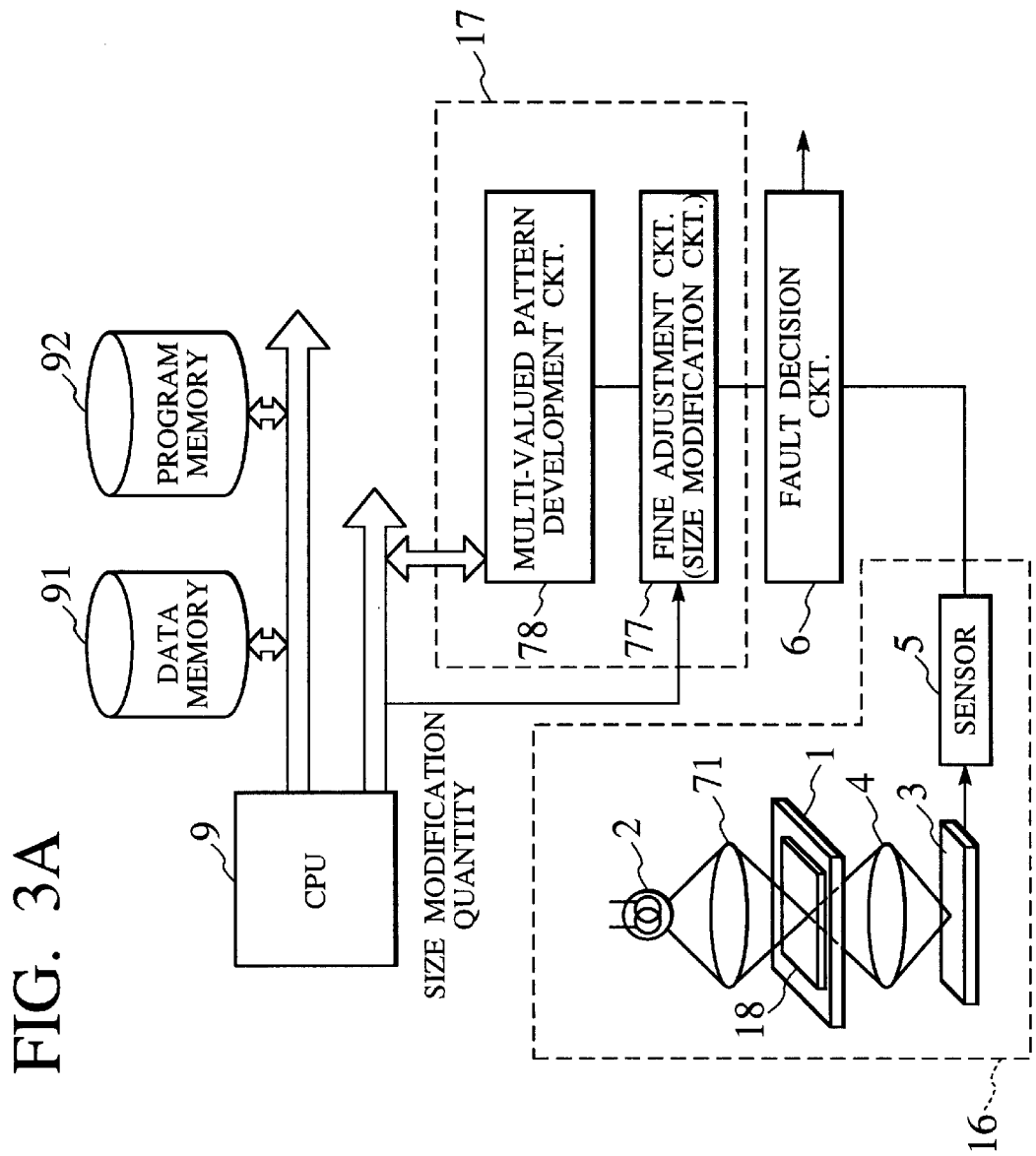

FIG. 8

| E.G \ R | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 1 |
| 7 | 0 | 0 | 0 | 0 | 0 | 0 | 0 | 0 | 0 | 0 | 0 | 0 | 0 | 0 | 0 | 1 | 1 |
| 8 | 0 | 0 | 0 | 0 | 0 | 0 | 0 | 0 | 0 | 0 | 0 | 0 | 0 | 0 | 1 | 1 | 1 |
| 9 | 0 | 0 | 0 | 0 | 0 | 0 | 0 | 0 | 0 | 0 | 0 | 0 | 0 | 1 | 1 | 1 | 2 |
| 10 | 0 | 0 | 0 | 0 | 0 | 0 | 0 | 0 | 0 | 0 | 0 | 0 | 1 | 1 | 2 | 2 | 2 |
| 11 | 0 | 0 | 0 | 0 | 0 | 0 | 0 | 0 | 0 | 0 | 1 | 1 | 1 | 2 | 2 | 3 | 3 |
| 12 | 0 | 0 | 0 | 0 | 0 | 0 | 0 | 0 | 1 | 2 | 1 | 2 | 2 | 2 | 3 | 4 | 4 |
| 13 | 0 | 0 | 0 | 0 | 0 | 0 | 1 | 1 | 1 | 2 | 2 | 3 | 3 | 3 | 4 | 5 | 5 |
| 14 | 0 | 0 | 0 | 0 | 0 | 0 | 2 | 3 | 4 | 5 | 6 | 8 | 9 | 10 | 11 | 12 | 13 |
| 15 | 0 | 0 | 0 | 0 | 0 | 2 | 2 | 3 | 4 | 5 | 6 | 8 | 9 | 10 | 11 | 12 | 13 |
| 16 | 0 | 0 | 0 | 0 | 1 | 2 | 2 | 3 | 4 | 5 | 6 | 8 | 9 | 10 | 11 | 12 | 13 |

FIG. 9

| NR\CP | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 | 16 |
| 1 | 1 | 2 | 3 | 4 | 5 | 6 | 7 | 8 | 9 | 10 | 11 | 12 | 13 | 14 | 15 | 16 | 16 |
| 2 | 2 | 3 | 4 | 5 | 6 | 7 | 8 | 9 | 10 | 11 | 12 | 13 | 14 | 15 | 16 | 16 | 16 |
| 3 | 3 | 4 | 5 | 6 | 7 | 8 | 9 | 10 | 11 | 12 | 13 | 14 | 15 | 16 | 16 | 16 | 16 |
| 4 | 4 | 5 | 6 | 7 | 8 | 9 | 10 | 11 | 12 | 13 | 14 | 15 | 16 | 16 | 16 | 16 | 16 |
| 5 | 5 | 6 | 7 | 8 | 9 | 10 | 11 | 12 | 13 | 14 | 15 | 16 | 16 | 16 | 16 | 16 | 16 |
| 6 | 6 | 7 | 8 | 9 | 10 | 11 | 12 | 13 | 14 | 15 | 16 | 16 | 16 | 16 | 16 | 16 | 16 |
| 7 | 7 | 8 | 9 | 10 | 11 | 12 | 13 | 14 | 15 | 16 | 16 | 16 | 16 | 16 | 16 | 16 | 16 |
| 8 | 8 | 9 | 10 | 11 | 12 | 13 | 14 | 15 | 16 | 16 | 16 | 16 | 16 | 16 | 16 | 16 | 16 |
| 9 | 9 | 10 | 11 | 12 | 13 | 14 | 15 | 16 | 16 | 16 | 16 | 16 | 16 | 16 | 16 | 16 | 16 |
| 10 | 10 | 11 | 12 | 13 | 14 | 15 | 16 | 16 | 16 | 16 | 16 | 16 | 16 | 16 | 16 | 16 | 16 |
| 11 | 11 | 12 | 13 | 14 | 15 | 16 | 16 | 16 | 16 | 16 | 16 | 16 | 16 | 16 | 16 | 16 | 16 |
| 12 | 12 | 13 | 14 | 15 | 16 | 16 | 16 | 16 | 16 | 16 | 16 | 16 | 16 | 16 | 16 | 16 | 16 |
| 13 | 13 | 14 | 15 | 16 | 16 | 16 | 16 | 16 | 16 | 16 | 16 | 16 | 16 | 16 | 16 | 16 | 16 |
| 14 | 14 | 15 | 16 | 16 | 16 | 16 | 16 | 16 | 16 | 16 | 16 | 16 | 16 | 16 | 16 | 16 | 16 |
| 15 | 15 | 16 | 16 | 16 | 16 | 16 | 16 | 16 | 16 | 16 | 16 | 16 | 16 | 16 | 16 | 16 | 16 |
| 16 | 16 | 16 | 16 | 16 | 16 | 16 | 16 | 16 | 16 | 16 | 16 | 16 | 16 | 16 | 16 | 16 | 16 |

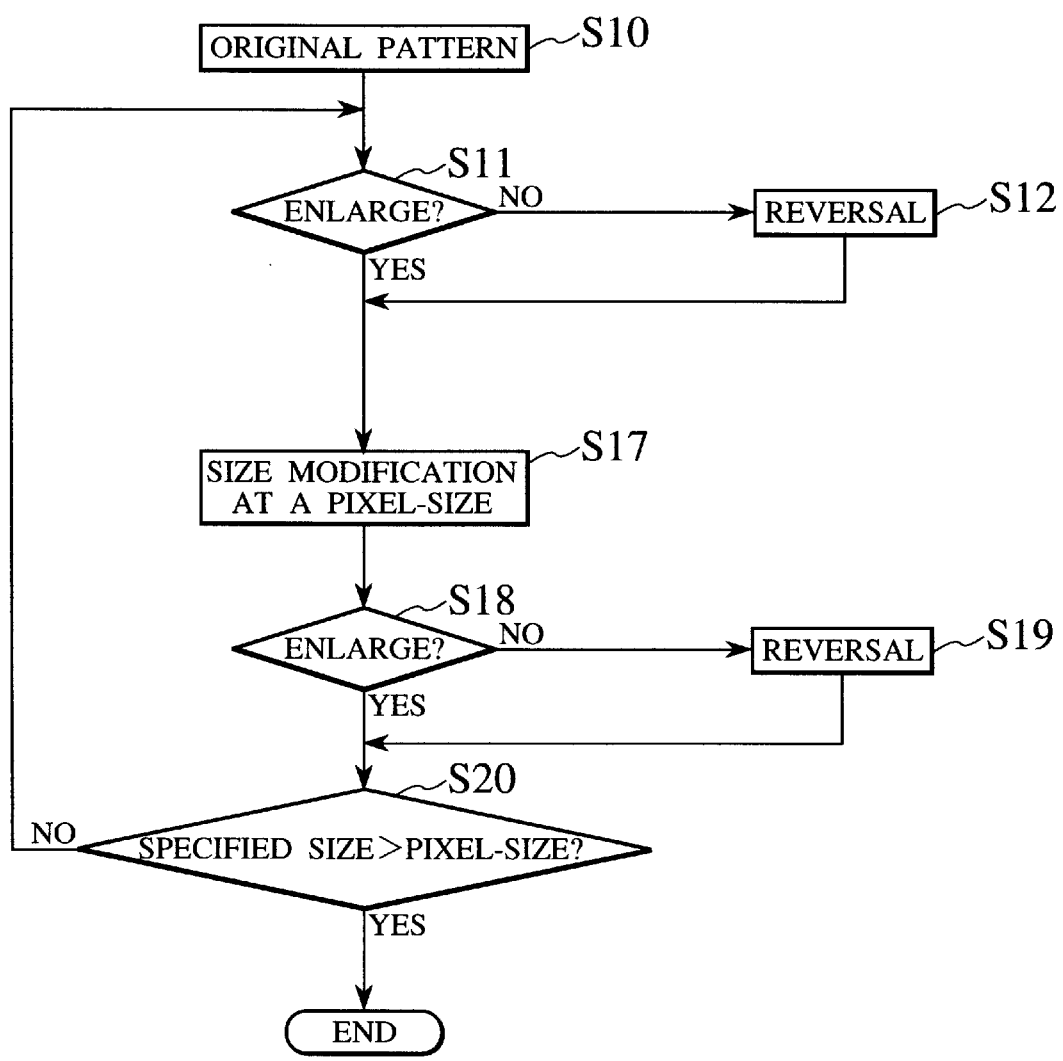

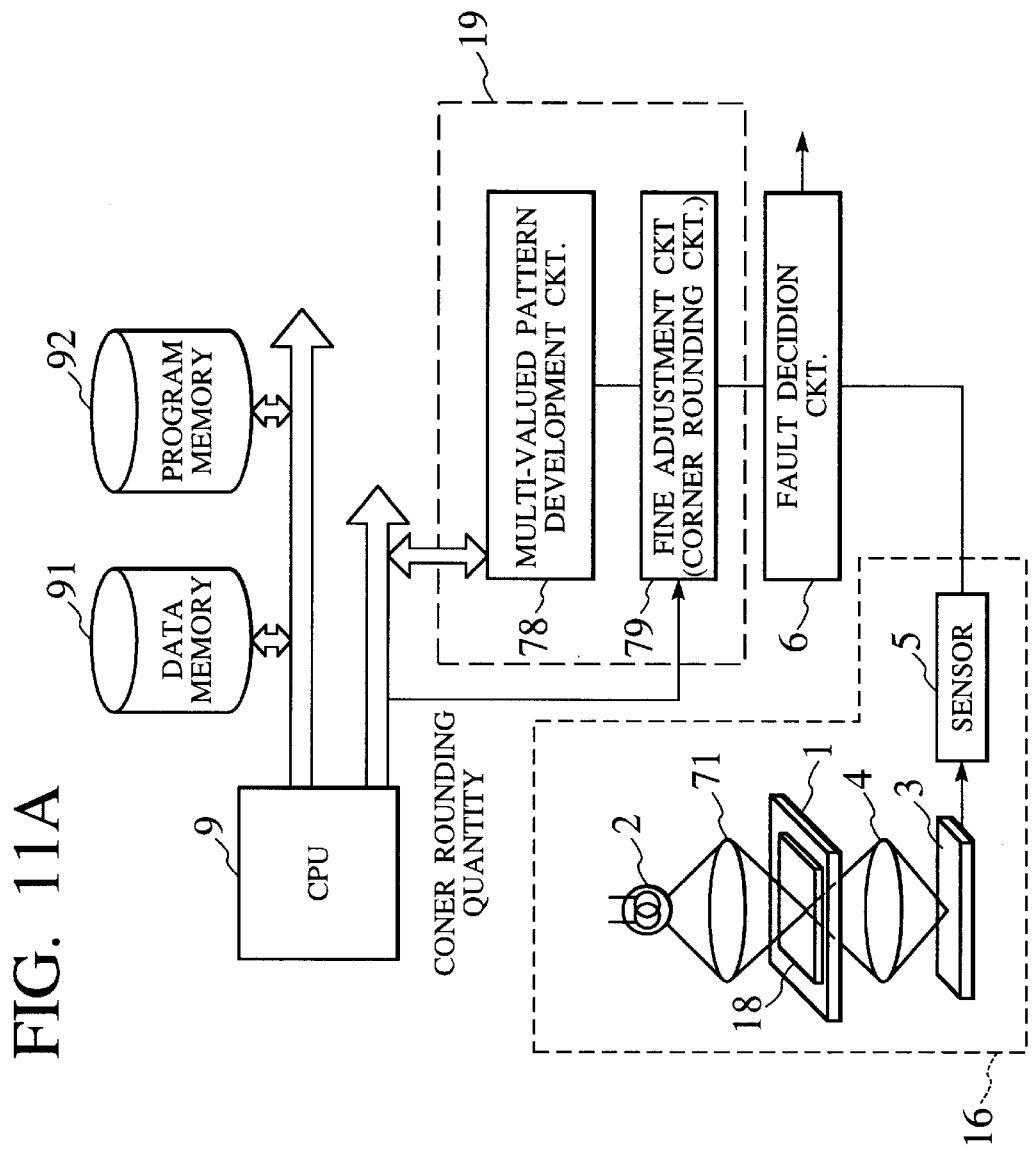

PATTERN INSPECTION EQUIPMENT, PATTERN INSPECTION METHOD, AND STORAGE MEDIUM STORING PATTERN INSPECTION PROGRAM

BACKGROUND OF THE INVENTION

1. Field of the Invention

The present invention relates to a technique of inspecting patterns such as photomask patterns formed on a sample used to fabricate semiconductor devices or liquid-crystal display (LCD) devices, or patterns formed on a sample such as a semiconductor or LCD device, to see if the patterns are sound without faults. In particular, the present invention relates to pattern inspection equipment, a pattern inspection method, and a computer-readable storage medium storing a pattern inspection program, for realizing such a technique.

2. Description of the Related Art

Large-scale integrated circuits (LSIs) are manufactured with the use of photolithography and photomasks. The yields of LSIs becomes poor if patterns of the photomasks have faults. Then, various kinds of equipment have been developed to inspect the faults in the photomask patterns.

Photomask patterns are formed by depositing a metal film such as a chrome film on a glass substrate, coating the metal film with photoresist, exposing, developing, and baking them, and etching the metal film with the photoresist as a mask. The etching may be wet etching, dry etching, or any other. According to the etching conditions, the undercuts, sidewall angles, anisotropy, pattern transformation of the metal film vary. The photomask patterns may have rounded corners depending on the photoresist exposing conditions and the metal film etching conditions. Then, an optical image taken from the actual photomask patterns generated on the glass substrate does not correctly match with designed patterns. Namely, the sizes, line widths, and edge positions of the actual photomask patterns slightly differ from those of the designed patterns serving as a reference to inspect the actual photomask patterns because the actual photomask patterns involve edge displacement and corner roundness while the designed patterns involve none of them.

As a result, the pattern inspection equipment frequently determines that the photomask patterns are defective even if they are substantially homothetic transformation of the designed patterns. And, if designed patterns are used as they are to inspect actual patterns, they will lead to erroneous results determining that the actual patterns have rounded corners and are defective, even if they are substantially same geometry as the designed patterns.

FIG. 1 shows pattern inspection equipment according to a prior art to cope with the situation that the actual photomask patterns can have slightly displaced edges. This equipment develops design data into pattern data and modifies the pattern data to adjust it to match with actual photomask patterns. The size-modified pattern data is used as reference data, which is compared with measured pattern data taken from the actual photomask patterns. A light source 2 emits light to irradiate a photomask 1 having patterns delineated according to the design data. The light passes through the photomask 1 and an object lens 4 and forms an optical image of the photomask patterns on a sensor 3. A sensor circuit 5 measures the image, digitizes it into measured pattern data, and transfers it to a fault decision circuit 6. Even if the actual photomask patterns have sharp edges, the measured pattern data does not provide perfect rectangular waveforms because the measured pattern data involves a blur produced by the optical observation system. Namely, the measured pattern data involves blurred edges.

On the other hand, a CPU 9 in a host computer system transfers the design data from a data memory to a binary pattern development circuit 8, which develops the design data into binary data made of "1s" and "0s". The binary data is sent to a size modification circuit 7, which adjusts the binary data to match with changes in the photomask patterns caused by mask manufacturing processes. The adjusted pattern data is sent to the fault decision circuit 6. A front stage of the fault decision circuit 6 carries out a convolution process on the resized pattern data, to correct it for the blur of the measured pattern data caused by the observation optical system. A rear stage of the fault decision circuit 6 compares the adjusted, convoluted pattern data with the measured pattern data, to see if the photomask patterns have faults.

The size modification process carried out by the size modification circuit 7 will be explained. The design data used to delineate the photomask patterns is developed by the binary pattern development circuit 8 into binary data consisting of "1s" and "0s". FIG. 2A shows an array 15 of "n×n" pixels in the binary data. The size modification circuit 7 calculates an OR of "1s" and "0s" in peripheral pixels 21 of the array 15. According to the OR, the size modification circuit 7 corrects a value at central pixel 22 of the array 15 to 1 or 0, thereby adjusting the sizes and line widths of the binary data to match with those of the actual photomask patterns. The fault decision circuit 6 compares the corrected pattern data with the measured pattern data, to see if the photomask patterns have faults.

The size of a sensor element (sensor pixel) of the sensor 3 is usually equal to the size of a pixel of the pattern data, and the size modification process is carried out pixel by pixel. As a result, the adjustment of design data to match with actual photomask patterns is restricted by the pixel size, and if a pattern edge is displaced by half a pixel size, the pattern inspection equipment will detect it as a fault. To avoid this type of erroneous detection, the equipment of the prior art must lower a threshold to determine a fault. This, however, may result in overlooking actual faults that must be detected.

To correctly adjust design data to measured data that contains slightly displaced edges, there is an idea of developing the design data into pattern data consisting of pixels each being smaller than a sensor pixel. This idea, however, increases the quantity of the pattern data and needs high-speed data processing circuits to elongate a processing time and increase inspection costs.

To cope with the situation that actual photomask pattern has the roundness of corners, the prior art develops design data into binary data and rounds corners in the binary data to approximate the actual photomask patterns. The binary data is made of "1s" and "0s" and is scanned with a pixel area 20 of FIG. 2B. The pixel area 20 has a central pixel 22 and a radius "r." The value of the central pixel 22 is set to "1" or "0" according to a majority of "1s" and "0s" in the pixel area 20. By determining the value of the central pixel of each pixel area according to a majority, the prior art adjusts corners of the design data to match with those of the actual photomask patterns. The corner-rounded design data serves as reference data. The fault decision circuit 6 compares the reference data with measured pattern data taken from the actual photomask patterns, to see if the photomask patterns have faults. The measured pattern data is obtained by irradiating the photomask patterns with light and by detecting light transmitted through the photomask patterns with a sensor.

The prior art hardly determines a value representing a pattern corner if the size of a sensor pixel is equal to the size of a pattern pixel. More precisely, if an edge of a pattern image crosses the center of a sensor pixel and covers a half of the sensor pixel, the prior art is unable to determine whether it is "1" or "0". Namely, the rounding process that is carried out pixel by pixel is incapable of precisely expressing actual photomask patterns. Eventually, the prior art must lower a fault detecting threshold to avoid erroneous detection at the corners of photomask patterns. This leads to overlooking fatal faults that must be detected.

To solve this problem, design data may be developed into binary data whose pixel size is smaller than a sensor pixel, and the binary data is adjusted to match with the roundness of corners of actual photomask patterns, similar to the technique of coping with the slightly displaced edges of photomask patterns. However, making the size of each pixel of the binary data smaller than the size of a sensor pixel increases the quantity of the binary data to raise a problem of needing large-capacity storage devices and high-speed data processing circuits. This technique is unable to completely cope with the corner roundness of actual photomask patterns because the actual corner roundness is irregular depending on corner sizes and types and etching conditions.

In this way, the pattern inspection equipment of the prior art that compares design data used to delineate patterns on a photomask substrate with measured data taken from the delineated actual photomask patterns is unable to adjust the design data to match with the slightly displaced edges of the actual photomask patterns and the minute roundness of the corners of the photomask patterns.

Making the size of a pixel of the developed pattern data smaller than a sensor pixel size to adjust the pattern data to match with the microscopically displaced edges and rounded corners of the actual photomask patterns increases the quantity of the pattern data to raise a need of high-performance computers and high costs.

The prior art is unable to completely adjust the pattern data to the minute edge displacements and corner roundness of the photomask patterns because they are irregular depending on exposing and etching conditions.

SUMMARY OF THE INVENTION

An object of the present invention is to solve the problems of the prior art.

More precisely, an object of the present invention is to provide pattern inspection equipment capable of correctly shifting a position of pattern edge and/or correctly rounding a corner of pattern corresponding to the design data that is used to delineate the pattern on an object, thereby adjusting the design data to match with the slightly displaced edges and rounded corners of the delineated actual pattern. These displaced edges and rounded corners are usually caused by pattern manufacturing process such as the etching process of the patterns on the object. Even if a black-and-white boundary of the actual patterns is displaced by a fine distance shorter than the size of a sensor pixel, the present invention is capable of correctly comparing measured data taken from the actual patterns with the design data.

Another object of the present invention is to provide high-speed pattern inspection equipment capable of precisely adjusting design data to match with the minutely displaced edges and rounded corners of actual patterns that have been delineated from the design data, without reducing the sizes of pixels of the design data.

Still another object of the present invention is to provide pattern inspection equipment capable of flexibly coping with the irregularly displaced edges and rounded corners of actual patterns. These irregularities are dependent on the sizes and types of the patterns.

Still another object of the present invention is to provide a pattern inspection method capable of precisely adjusting a position of a pattern edge and roundness at corner in a pattern constructed with design data to match with the minutely displaced edges and rounded corners of actual patterns delineated from the design data. Even if a black-and-white boundary of the patterns is displaced by a distance shorter than the size of a sensor pixel, the pattern inspection method of the present invention is capable of precisely adjusting the design data to compare with the measured data taken from the actual patterns.

Still another object of the present invention is to provide a pattern inspection method capable of flexibly coping with the irregular edge displacements and corner roundness of actual photomask patterns. These irregularities are dependent on the size and type of the patterns.

Still another object of the present invention is to provide a storage medium for storing a pattern inspection program that is capable of precisely adjusting design data to match with measured data taken from actual patterns that have been delineated based on the design data, even if a black-and-white boundary of the patterns is displaced by a distance shorter than the size of a sensor pixel.

Still another object of the present invention is to provide a storage medium for storing a pattern inspection program that is capable of flexibly coping with the irregular edge displacements and corner roundness of patterns that have been delineated on an object based on design patterns. These irregularities are dependent on the sizes and types of the patterns.

In order to accomplish the objects, a first aspect of the present invention comprises a measured data generation unit and a reference data generation unit. The measured data generation unit generates measured data from patterns that have been delineated on a sample according to design data. The measured data may be obtained after detecting light transmitted through or reflected from the patterns formed on the sample such as the photomask substrate, or semiconductor substrate, or LCD substrate, and converting the transmitted or reflected light into digital measured data. The measured data can be obtained by detecting scattered light from the patterns formed on the sample. The reference data generation unit generates reference data used to compare with the measured data to inspect faults in the actual patterns delineated on the sample. This equipment is characterized by the reference data generation unit comprising a multi-valued pattern development circuit and a fine adjustment circuit. The multi-valued pattern development circuit develops the design data into gradational data expressed in multiple gradation levels, and the fine adjustment circuit finely adjusts the pattern edges represented by the gradational data. The number of the "multiple gradation levels" to express gradational data is a multiple of 4 such as 4, 8, 16, 32, and the like except 2. "Finely adjusts pattern edges" means to finely adjusts position of the pattern edge represented by the pattern data when the black-and-white boundaries (edges) of actual patterns are slightly displaced by a distance smaller than the size of a sensor pixel, or to finely rounding a corner of the pattern represented by the pattern data when the corners of the actual patterns are minutely rounded with dimensions below the size of a sensor pixel.

To finely adjust edges of, or to finely modify sizes of patterns constructed with the design data to match with the measured data, the pattern inspection equipment of the first aspect may have at least the multi-valued pattern development circuit for developing the design data into gradational data expressed in multiple gradation levels, a size modification circuit for shifting the side of the pattern constructed with the gradational data to form the reference data, and a fault decision circuit for comparing the reference data with the measured data. The fault decision circuit compares the measured data with the reference data, and determining whether or not the patterns on the sample have fatal faults. The size modification circuit may modify the gradational data by detecting a maximum value in each specified area in the gradational data to enlarge or to reduce the pattern constructed with the gradational data.

To cope with slight roundness at the corners of the patterns on the sample, the fine adjustment circuit may have a corner rounding circuit for rounding corners in the pattern constructed with the gradational data. The corner rounding circuit may have at least a corner detector for converting the gradational data into binary data and detecting pattern corners based on the binary data. The corner rounding circuit carries out the "rounding process" on the design data, to cope with a variety of fine changes happening on the actual patterns due to various factors related to pattern manufacturing processes. The first aspect is capable of adjusting the design data to match with the measured data taken from the actual patterns and comparing the adjusted design data with the measured data, to correctly determine whether or not the patterns have fatal faults.

As mentioned above, the pattern inspection equipment of the first aspect is capable of precisely adjusting given design data to match with minute changes in position of edges and roundness of corners on actual patterns formed from the design data so that the adjusted design data may serve as reasonable reference data to be compared with measured data taken from the actual patterns. These small changes in the actual patterns are caused by various reasons related to manufacturing processes of the actual patterns and may sometimes make a pattern edge run across the center of a sensor pixel. Even in such a case, the pattern inspection equipment of the first aspect correctly determines whether or not the patterns are sound without faults. This equipment precisely adjusts the design data to match with the actual patterns without reducing the size of each pixel of the gradational data developed from the design data smaller than a sensor pixel, thereby minimizing an increase in the quantity of the reference data, speeding up the pattern inspection, and reducing the cost of the pattern inspection.

Even if the edges of the actual patterns irregularly change depending on the dimensions and forms of the patterns, the equipment of the first aspect flexibly adjusts the design data to cope with such changes in the actual patterns. The equipment of the first aspect is applicable to a variety of inspection practices.

A second aspect of the present invention provides a pattern inspection method having at least the steps of developing design data into gradational data expressed in multiple gradation levels, finely adjusting edges in the gradational data and generating reference data, generating measured data from actual patterns delineated by using the design data on a sample, and comparing the measured data with the reference data. The number of the "multiple gradation levels" used to express gradational data is a multiple of 4 and not 2. "Finely adjusting edges" means to finely shift the position of displaced edges or finely rounding the corners of patterns having dimensions less than the size of a sensor pixel.

Instead of shifting the position of edges or rounding corners of pattern constructed with gradational data pixel by pixel, the pattern inspection method of the second aspect finely adjusts them using the multiple gradation levels to cope with slight changes in the edges and corners of actual patterns due to pattern manufacturing processes, thereby improving the practicability of the pattern inspection. Without reducing the size of each pixel of the gradational data smaller than the size of a sensor pixel, the second aspect correctly adjusts the gradational data to match with the actual patterns and quickly complete the pattern inspection. Even if the edges of the actual patterns involve irregular changes depending on the dimensions and forms of the patterns, the second aspect flexibly adjusts the gradational data to match with the actual patterns. Consequently, the pattern inspection method of the second aspect is practical and meets a variety of inspection requirements.

A third aspect of the present invention provides a storage medium readable by computer, for storing a program that executes the pattern inspection method of the second aspect. The program includes at least the steps of developing design data used to delineate patterns on a sample, into gradational data expressed in multiple gradation levels, finely adjusting edges in the gradational data and generating reference data, generating measured data from the delineated actual patterns, and comparing the measured data with the reference data. The storage medium stores the program, which is read by computer so that a central processing unit (CPU) of the computer may execute the program to carry out the pattern inspection method of the second aspect of the present invention. The storage medium may be a semiconductor memory such as a RAM or ROM, a magnetic disk, an optical disk, a magneto-optical disk, a magnetic tape, etc., capable of recording the program.

Stored in the storage medium of the third aspect of the present invention, the program is capable of adjusting pattern data to match with fine changes occurring in actual patterns due to pattern manufacturing processes and coping with a variety of inspection requirements. Similar to the second aspect, the program stored in the storage medium of the third aspect precisely adjusts pattern data to actual patterns without reducing the size of a pixel of gradational data smaller than the size of a sensor pixel. In addition, the program flexibly copes with pattern edges that irregularly change depending on the dimensions and forms of the patterns, thereby meeting a variety of inspection requirements.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 3A is a block diagram schematically showing pattern inspection equipment according to a first embodiment of the present invention;

FIG. 8 shows a lookup table used by the size modification circuit of the present invention to determine a new size modification quantity for an oblique side in pattern data;

FIG. 9 shows a lookup table used by the size modification circuit of the present invention to determine a size modification quantity for an oblique side in pattern data;

FIG. 10 is a flowchart for enlarging or reducing the pattern size by more than two pixels;

FIG. 11A is a block diagram schematically showing pattern inspection equipment according to a second embodiment of the present invention;

FIG. 13 shows models of gradational data to be detected as corners by the corner rounding circuit of the second embodiment of the present invention;

FIG. 16 shows models of rounding data generated by a rounding data generation circuit of the corner rounding circuit of the second embodiment of the present invention;

DETAILED DESCRIPTION OF THE EMBODIMENTS

Figure 1:
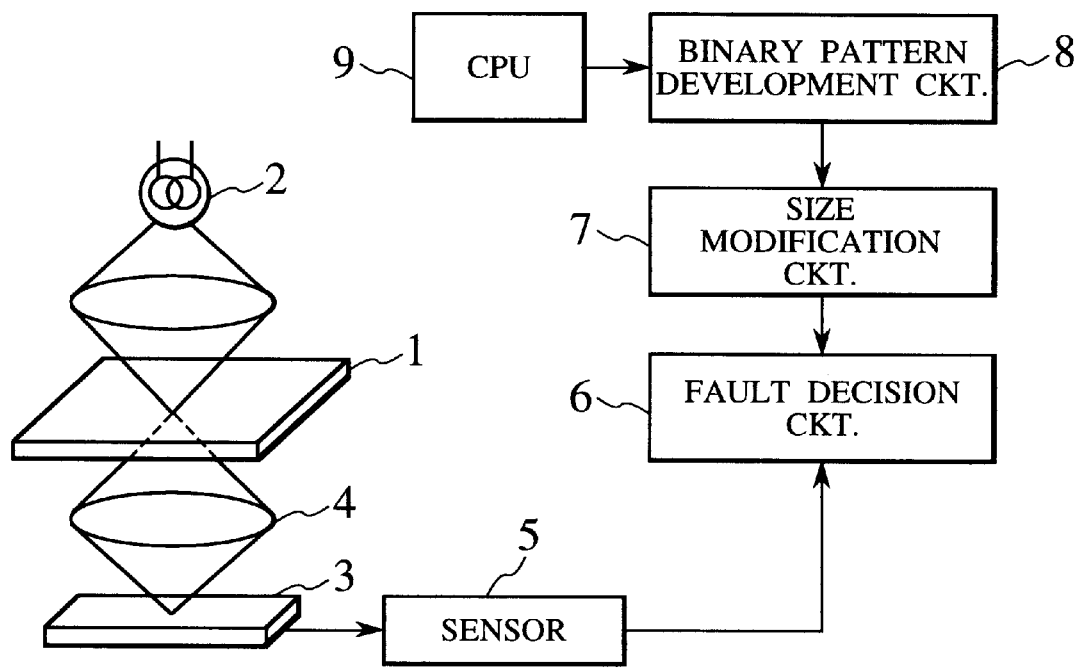
FIG. 1 is a block diagram schematically showing pattern inspection equipment according to a prior art.
Figure 2A:
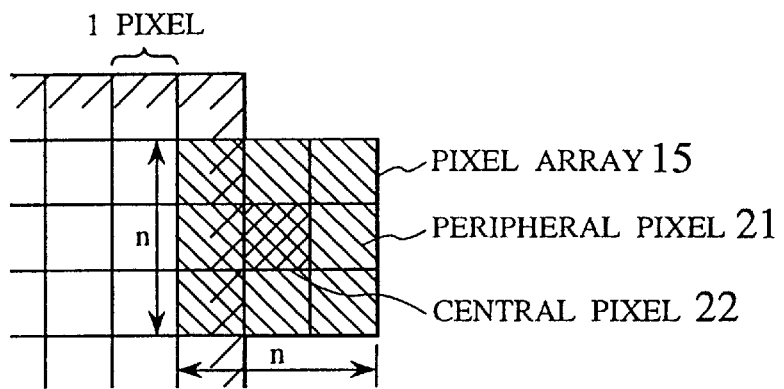
FIG. 2A shows a size modification method according to the prior art.
Figure 2B:
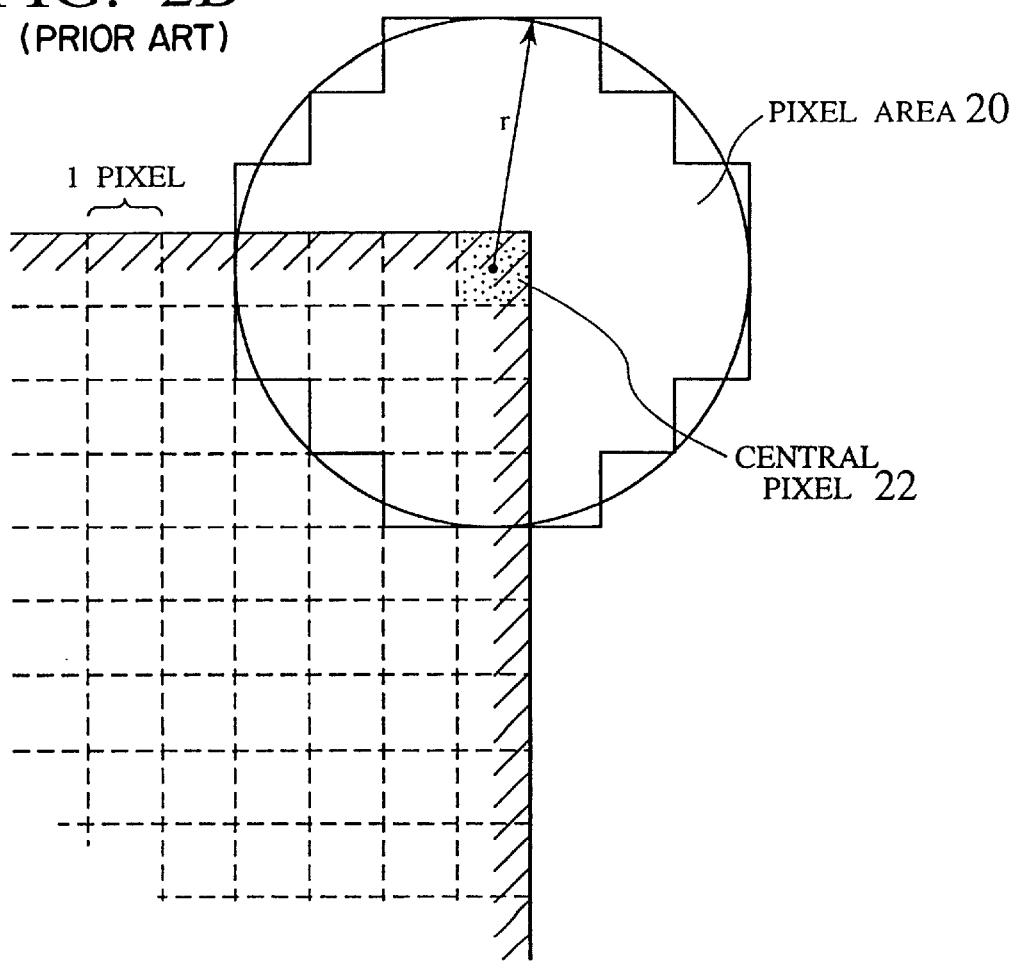
FIG. 2B shows a corner rounding technique according to the prior art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIRST EMBODIMENT

Outline of Pattern Inspection Equipment

FIG. 3A shows an outline of pattern inspection equipment according to a first embodiment of the present invention. The equipment has at least a measured data generation unit 16 for generating measured data from actual patterns delineated on a sample 1, and a reference data generation unit 17. The equipment also has a host computer having a CPU 9. The CPU 9 has an input unit (not shown) for receiving data and instructions entered by an operator, an output unit (not shown) for providing an inspection result, a data memory 91 for storing design data, and a program memory 92 for storing an inspection program. These elements are connected to one another through a data bus.

The measured data generation unit 16 has an optical image acquiring system including parts 1, 2, 4, and 71, for obtaining an optical image of the patterns, a photoelectric converter 3 for converting the optical image into an analog electric signal, and a sensor circuit 5 for converting the analog electric signal into a digital electric signal to provide measured data.

The sample on which the patterns are delineated is a photomask substrate 18, which is placed on a sample table 1. The sample table 1 is a triaxial (X-Y-θ) manipulator that is movable in X- and Y-directions and rotatable in θ-direction under the control of a table control circuit controlled by the CPU 9. More precisely, the sample table 1 is driven by an X-motor in the X-direction, by a Y-motor in the Y direction, and by a θ-motor in the θ-direction. These motors may be standard step motors. The positional coordinate data of the sample table 1 are measured by, for example, a laser measuring system whose output is sent to a position circuit (not shown). The position circuit feeds positional coordinate data back to the table control circuit.

The photomask substrate 18 is automatically set on the sample table 1 by an autoloader (not shown) and is automatically discharged thereby after the completion of inspection. The sample table 1 has a window for passing light. Above the sample table 1 is a light emitting system consisting of the light source 2 and condenser lens 71. The light source 2 emits light, which passes through the condenser lens 71 and irradiates the photomask substrate 18 on the sample table 1. Under the photomask substrate 18 is a signal detection system consisting of the condenser lens 4 and photoelectric converter 3. The photoelectric converter 3 may be a photodiode array. The light transmitted through the photomask substrate 18 passes through the condenser lens 4 and forms an image on the photodiode array 3. The condenser lens 4 is provided with a focus adjuster made of, for example, a piezoelectric element to automatically adjust the focus of the condenser lens 4. The focus adjuster is controlled by an autofocus controller connected to the CPU 9. The adjustment of the focus of the condenser lens 4 may be monitored by a separate observation scope.

The photodiode array 3 is a line sensor or an area sensor consisting of plural sensor pixels. When the sample table 1 is continuously moved in the X-direction, the photodiode array 3 provides a signal corresponding to the actual patterns on the photomask substrate 18. The signal is converted by the sensor circuit 5 into a digital signal, which is aligned by a line buffer to provide measured data. The measured data is sent to a fault decision circuit 6. The measured data may be unsigned 8-bit data to represent the brightness of a given sensor pixel. The measured data involves a blur due to the optical image acquiring system. Even if the patterns have sharp edges, pulse edges in the measured data do not provide perfect rectangular pulse waveforms. Instead, they provide rounded pulse waveforms. The blur caused by the optical image acquiring system is dependent on the resolution and aperture characteristics of the lenses of the optical image acquiring system and the interference (aperture effect) of adjacent sensor pixels of the photodiode array 3.

Figure 3B:
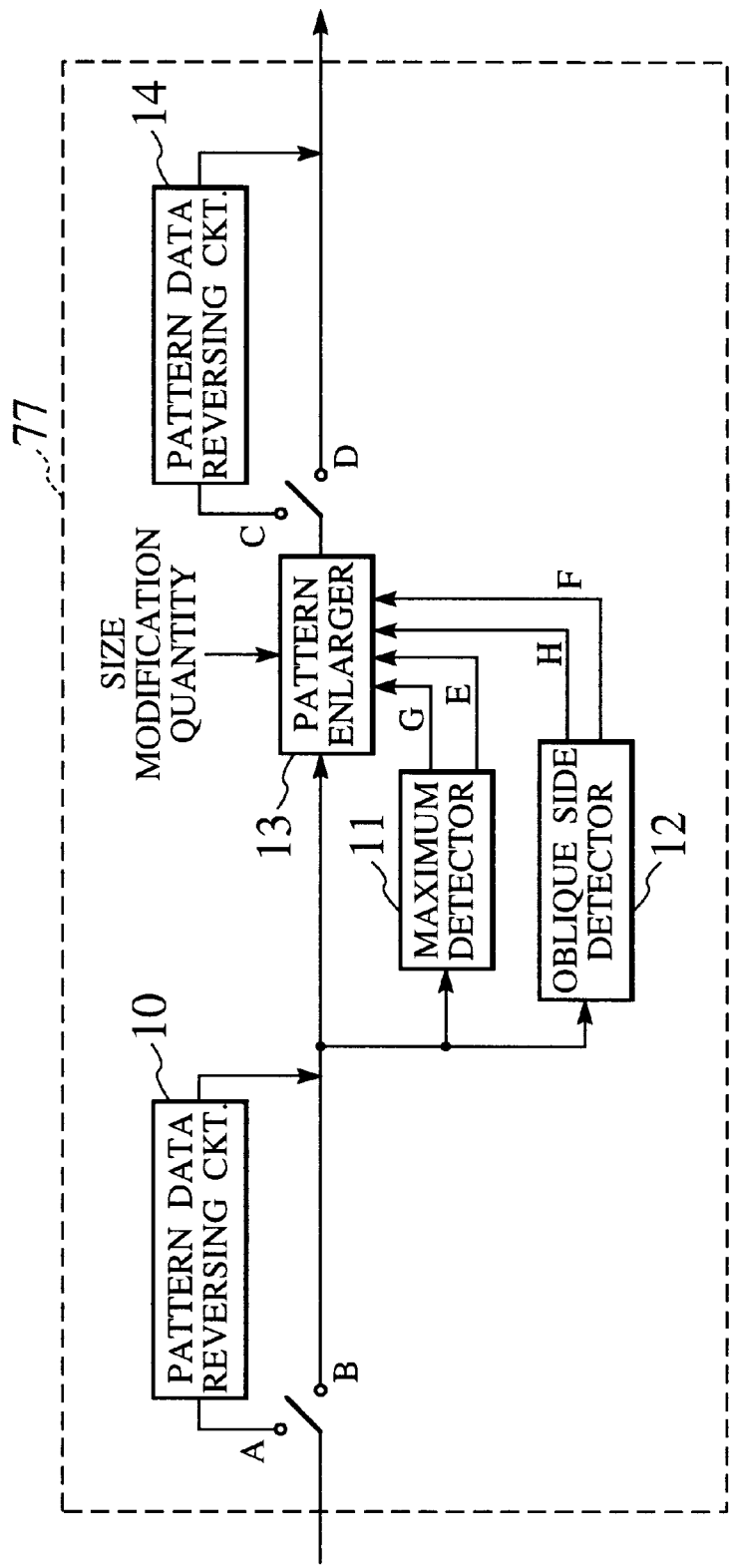
FIG. 3B is a block diagram showing the details of a size modification circuit of the equipment of FIG. 3A.

The reference data generation unit 17 consists of a multi-valued pattern development circuit 78 and a fine adjustment circuit 77 connected to the multi-valued pattern development circuit 78. The fine adjustment circuit 77 of the first embodiment is a size modification circuit for finely shifting the position of edges in the pattern constructed with the design data to match with those of actual patterns. The size modification circuit 77 is different from the size modification circuit 7 of the prior art. The details of the size modification circuit 77 are shown in FIG. 3B and will be explained later. The size modification circuit 77 is connected to the fault decision circuit 6. The multi-valued pattern development circuit 78 can be connected to an external storage device, or the data memory 91 through the data bus of the host computer. The data memory 91 stores the design data, which is sent to the multi-valued pattern development circuit 78, which develops the design data into gradational data expressed in multiple gradation levels. The gradational data is sent to the size modification circuit 77. The size modification circuit 77 modifies the size of the pattern constructed with the gradational data, to accommodate fine changes in the edge positions of actual photomask patterns due to mask manufacturing processes. The modified gradational data is sent to the fault decision circuit 6. A front stage of the fault decision circuit 6 executes "convolution" of the data to correct the blur caused by the optical image acquiring system. Namely, the front stage of the fault decision circuit 6 employs a point split function to carry out a weighted addition operation and a multivalued data creating operation on the size-modified data, to approximate the blur. A rear stage of the fault decision circuit 6 compares the convoluted pattern data with the measured data from the sensor circuit 5, to see if the patterns on the photomask substrate 18 have faults.

The input unit (not shown) of the host computer may include a keyboard, mouse, light pen, floppy disk drive, console, and magnetic card device. The output unit (not shown) of the host computer may include a display unit such as a pattern monitor and a mini-printer.

The pattern inspection equipment according to the first embodiment of the present invention is characterized by the multi-valued pattern development circuit 78 for developing design data into gradational data expressed in multiple gradation levels and by the size modification circuit 77. The size modification circuit 77 (FIG. 3B) has a first pattern data reversing circuit 10, a second pattern data reversing circuit 14, a maximum detector 11, an oblique side detector 12, and a pattern enlarger 13. These parts may not always be hardware. The size modification circuit 77 as a whole may be realized by software in a general-purpose computer system, to provide the functions mentioned below.

The size modification circuit 77 preferably recognizes the shapes of patterns in the gradational data provided by the multi-valued pattern development circuit 78 and separately processes vertical and horizontal sides from oblique sides in the gradational data. The size modification circuit 77 may isotropically enlarge and reduce the size of a given polygonal patterns constructed with the gradational data, irrespective of the shapes of the patterns or the inclination of the sides of the patterns. "Isotropically" means to equally shift the position of each side along the orthogonal direction to each side of the given polygonal pattern. Namely, a triangle pattern is homothetic transformed to a similar triangle pattern having an enlarged or reduced size.

In FIG. 3B, the first pattern data reversing circuit 10 selects A or B depending on whether given gradational data must be reduced or enlarged. Similarly, the second pattern data reversing circuit 14 selects C or D depending on whether the gradational data must be reduced or enlarged. If it must be reduced, the first pattern data reversing circuit 10 selects A, and the second pattern data reversing circuit 14 selects C. If the gradational data has a maximum gradation level of "16", the first and second pattern data reversing circuits 10 and 14 transform "0" to "16", "1" to "15", . . . , and "16" to "0".

Figure 4A:
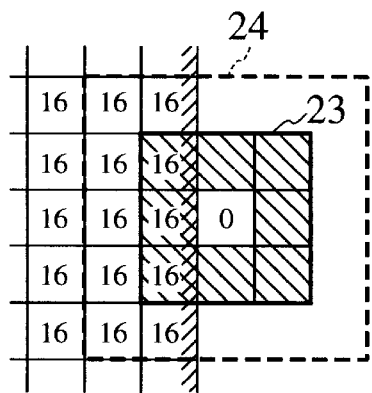
FIGS. 4A to 4I explain a process of shifting a position of a vertical or horizontal side carried out by the size modification circuit of the present invention.

The maximum detector 11 detects a maximum value "E" in peripheral pixels of a 3×3 scan window 23 (FIG. 4A). The 3×3 scan window 23 is specified in the gradational data. The maximum detector 11 detects a maximum value "G" in peripheral pixels of a 5×5 scan window 24 (FIG. 4A) that is larger than the scan window 23. The "peripheral pixels" in the scan window 23 are hatched in FIG. 4A with oblique lines running along upper-left to lower-right direction.

Figure 5A:
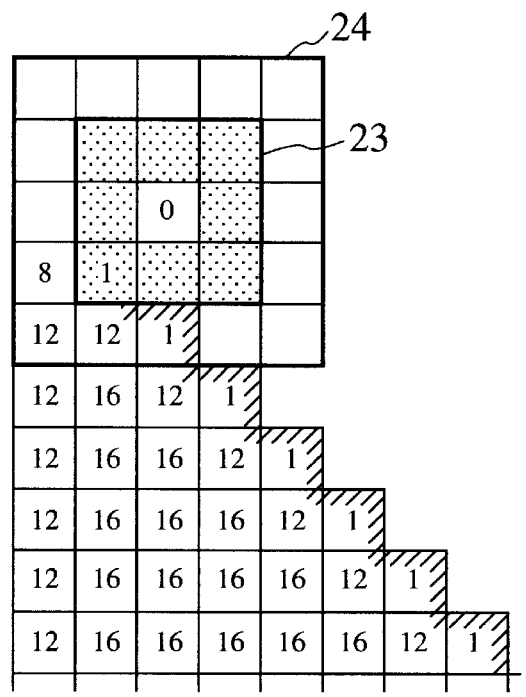
FIGS. 5A and 5B explain a process of shifting a position of an oblique side carried out by the size modification circuit of the present invention when an obliqueness flag H is 1.
Figure 5B:
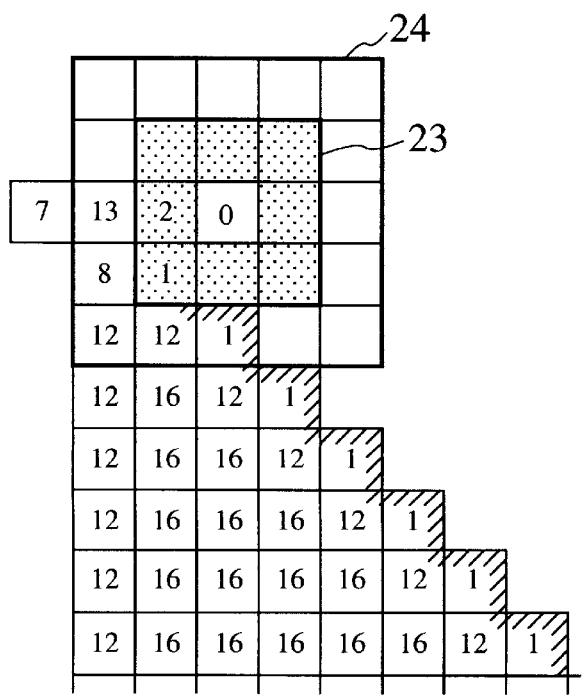

The oblique side detector 12 prepares binary data of peripheral pixels of a 3×3 scan window 23 of, for example, FIGS. 5A and 5B, carries out logic operations thereon, and detects an inclination in the scan window 23. Then, the oblique side detector 12 provides each pixel of the scan window 23 with an obliqueness flag "F" that is "1" if the pixel is on an oblique side, and "0" if the pixel is on a vertical or horizontal side. If there is at least one obliqueness flag "F" of "1" in the scan window 23 and if the scan window 23 contains a single pixel of pattern data, an obliqueness flag "H" of "1" is provided for the scan window 23.

The pattern enlarger 13 uses the gradational data from the first pattern-data reversing circuit 10 or from the multi-valued pattern development circuit 78, the maximum values "E" and "G" from the maximum detector 11, the obliqueness flags "F" and "H" from the oblique side detector 12, and a size modification quantity "R" from the CPU 9, to enlarge the size of pattern constructed with gradational data. Various size modification quantities are determined in advance according to photomask manufacturing conditions, and a proper size modification quantity R is selected among them depending on an object to inspect.

Size Modification Process

Figure 6A:
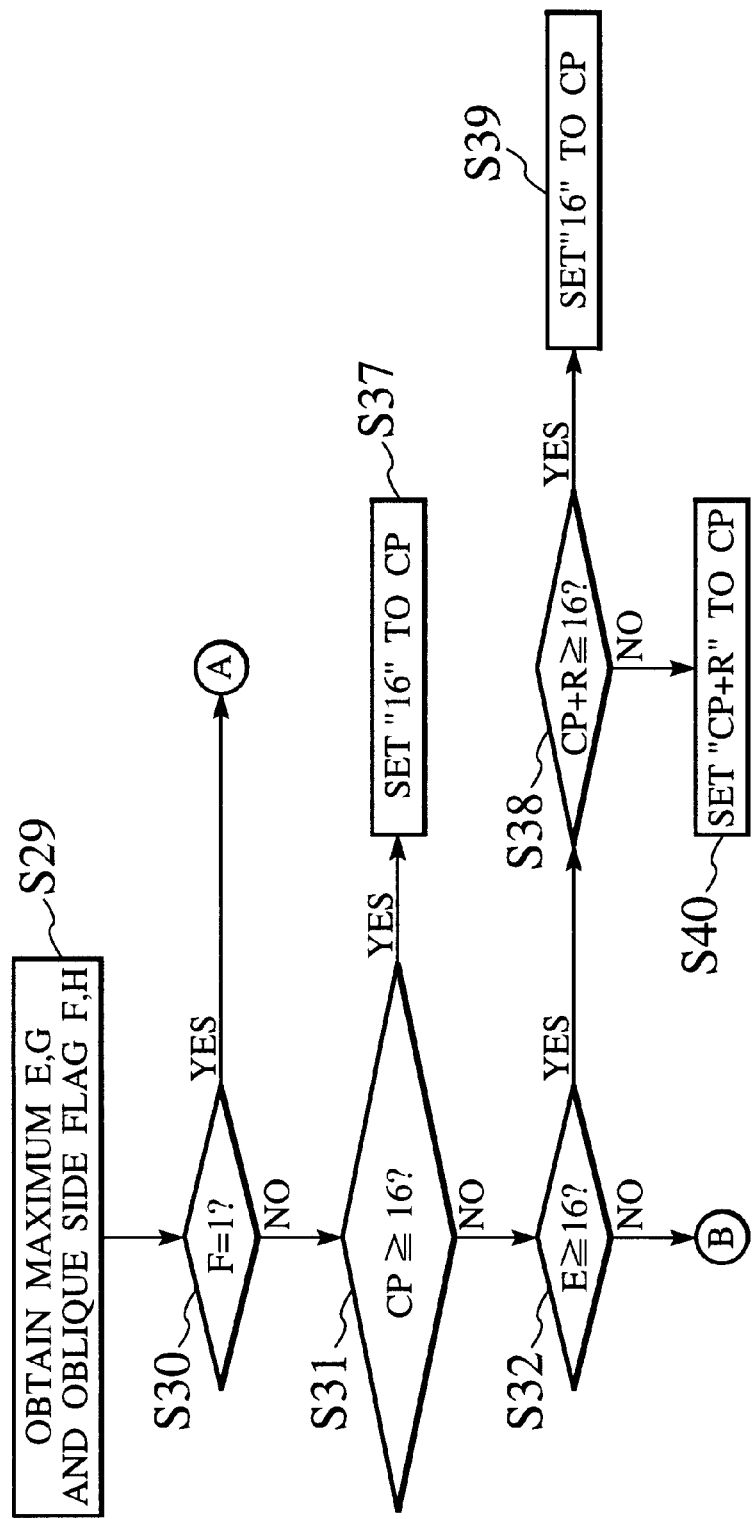
FIGS. 6A to 6C are flowcharts explaining processes carried out by the size modification circuit of the first embodiment.

A size modification process according to the present invention will be explained with reference to flowcharts of FIGS. 6A to 6C.

(a) Step S29 vertically and horizontally scans given gradational data with the 3×3 scan window 23 and 5×5 scan window 24. The maximum detector 11 finds maximum values "E" and "G" in peripheral pixels of the windows 23 and 24. The oblique side detector 12 determines the obliqueness flags "F" and "H" to indicate obliqueness in the scan window 23. In the following explanation, the 3×3 scan window 23 is simply referred to as the "scan window 23" to distinguish it from the 5×5 scan window 24.

(b) Step S30 checks the obliqueness flags F=1. If the scan window 23 includes an oblique side, step S50 of FIG. 6C is carried out. If the scan window 23 includes only a vertical or horizontal side, step S31 is carried out. Step S50 and steps that follow for an oblique side will be explained later.

(c) Step S31 compares the value of the central pixel ("CP") of the scan window 23 with an upper limit (16 in this first embodiment) of gradation level of the gradational data. If the value CP of the central pixel is equal to or greater than the upper limit, step S37 sets the upper limit to the value CP of the central pixel. The "central pixel" is located at the center of the scan window 23 (FIG. 4A).

(d) If the value CP of the central pixel is below the upper limit, step S32 compares the maximum value "E" with the upper limit. If the maximum value "E" is equal to or greater than the upper limit, step S38 adds a size modification quantity "R", which is provided by the CPU 9, to the value CP of the central pixel and compares the sum (CP+R) with the upper limit. If the sum (CP+R) is equal to or greater than the upper limit, step S39 sets the upper limit to the value CP of the central pixel, and if the sum is below the upper limit, step S40 sets the sum "CP+R" to the value CP of the central pixel.

Figure 6B:
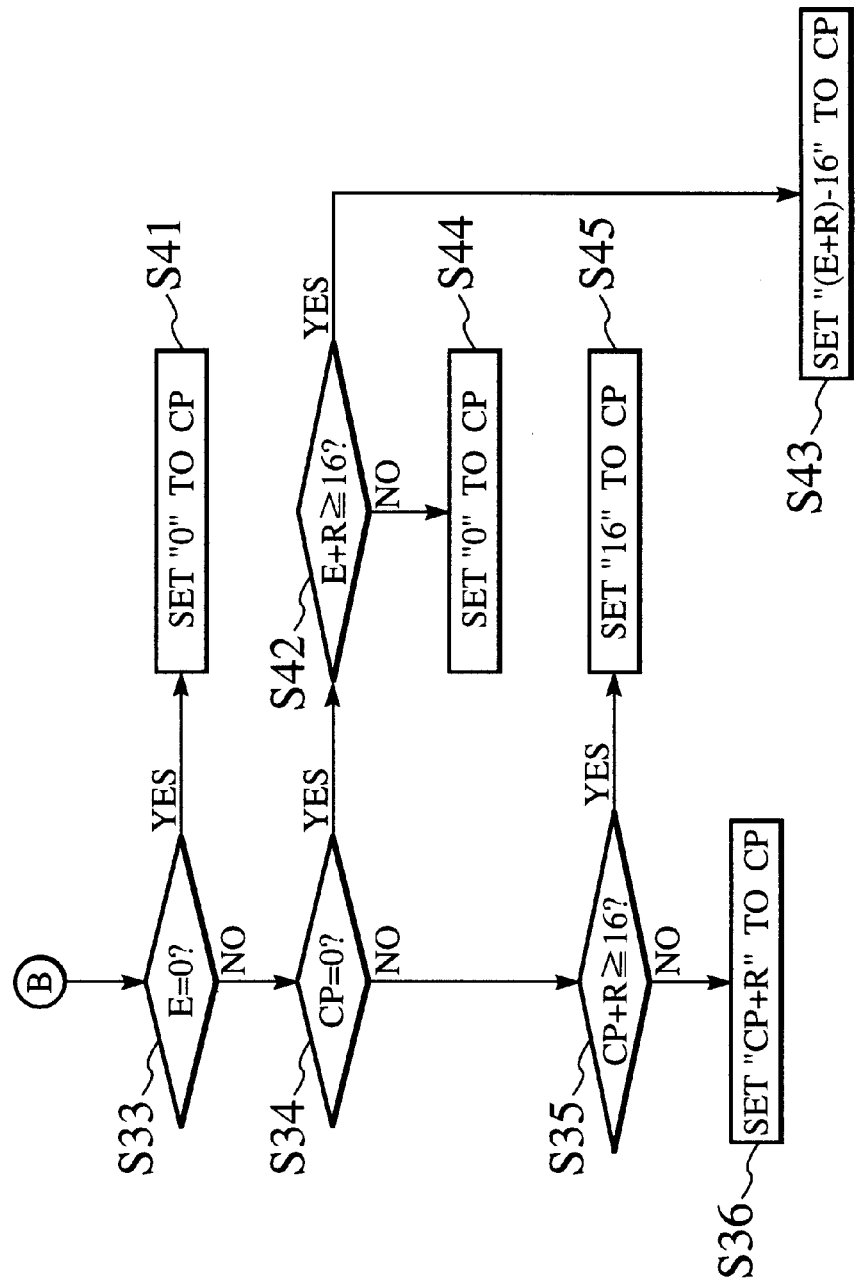

(e) If step S32 determines that the maximum value "E" is below the upper limit, step S33 of FIG. 6B compares the maximum value "E" with "0". If E=0, step S41 sets "0" to the value CP of the central pixel.

(f) If the maximum value "E" is not "0", step S34 compares the value CP of the central pixel with "0". If the value CP of the central pixel is "0", step S42 compares the sum of the maximum value "E" and the size modification quantity "R" with the upper limit of gradation level. If the sum "E+R" is equal to or greater than the upper limit, step S43 sets to the value CP of the central pixel a difference between the sum and the upper limit, and if the sum is below the upper limit, step S44 sets "0" to the value CP of the central pixel.

(g) If step S34 determines that the value CP of the central pixel is not "0", step S35 compares the sum of the value CP of the central pixel and the size modification quantity "R" with the upper limit. If the sum "CP+R" is equal to or greater than the upper limit, step S45 sets to the value CP of the central pixel the upper limit, and if the sum is below the upper limit, step S36 sets to the value CP of the central pixel the sum "CP+R".

Oblique Side

Size modification process with respect to an oblique side in a pattern constructed with the gradational data will be explained with reference to FIGS. 6C, 7A, and 7B.

Figure 6C:
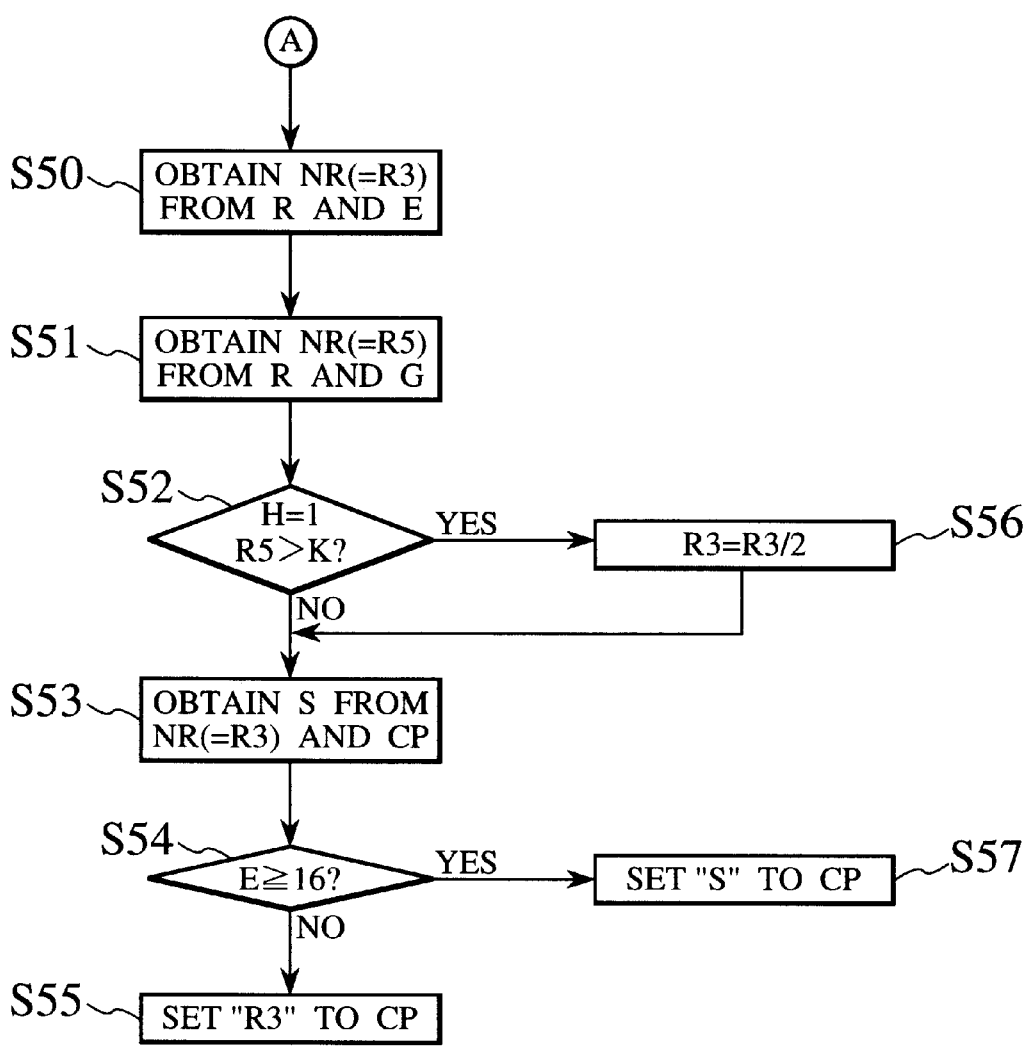

(a) Step S50 of FIG. 6C calculates a new size modification quantity "NR (=R3)" for an oblique side according to a size modification quantity "R" provided by the CPU 9 and the maximum value "E" of the peripheral pixels of the scan window 23. Step S51 calculates a new size modification quantity "NR (=R5)" for the oblique side according to the size modification quantity "R" provided by the CPU 9 and the maximum value "G" of the peripheral pixels of the 5×5 scan window 24. FIG. 8 shows an example of a lookup table giving the new size modification quantities "NR" from a relation between a size modification quantity "R" specified by the CPU 9 and a maximum value "E" of the scan window 23 or a maximum value "G" of the scan window 24.

(b) Step S52 determines whether or not the obliqueness flag "H" is "1". Step S52 further compares the new size modification quantity "NR (=R5)" obtained from the lookup table of FIG. 8 with a threshold value "K". If the flag "H" is "1" and the new size modification quantity "R5" is greater than the threshold value "K", step S56 halves the new size modification quantity R3. The threshold value "K" is set in advance according to empirical rules based on many simulations carried out according to the flowchart of FIG. 6C. The threshold value "K" is selected in such a way as to make the value CP of the central pixel of the scan window 23 not zero. For example, the value of the threshold "K" is 10.

(c) If the flag "H" is "0", or if the new size modification quantity R5 is below the threshold value "K", step S53 uses the new size modification quantity "NR (=R3)" and the value of the value CP of the central pixel of the scan window 23, to calculate an oblique side adjusting quantity S. FIG. 9 shows an example of a lookup table to give the oblique side adjusting quantities S from a relation between the value of the value CP of the central pixel and the new size modification quantity "NR".

(d) Step S54 compares the maximum value "E" with the upper limit of gradation level. If the maximum value "E" is equal to or greater than the upper limit, step S57 sets to the value CP of the central pixel to the oblique side adjusting quantity S, and if the maximum value "E" is below the upper limit, step S55 sets the new size modification quantity R3 to the value CP of the central pixel.

Size Enlargement Process

Figure 4B:
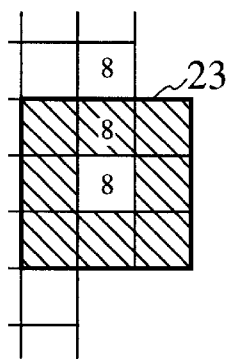
Figure 4C:
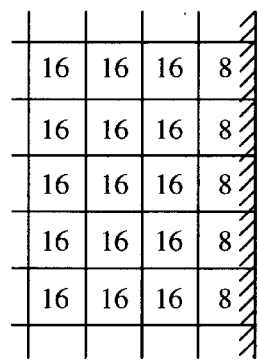

A size modification process for enlarging a pattern constructed with the gradational data by the size modification circuit 77 of FIG. 3B will be explained with reference to FIGS. 4A to 4I, 5A, 5B, 7A, and 7B. FIGS. 4A to 4I show gradational data involving a vertical or horizontal side, and FIGS. 5A, 5B, 7A, and 7B show gradational data involving an oblique side. FIGS. 4A to 4I will be explained first. It is assumed that the size of a sensor pixel of the photodiode array 3 (FIG. 3A) is 1 μm, a size modification length is 0.5 μm that is half the size of the sensor pixel, and an upper limit of gradation level of the gradational data is "16". A size modification quantity "R" specified by the CPU 9 is assumed to be "8". The maximum detector 11 (FIG. 3B) provides a maximum value "E" of "16", and the oblique side detector 12 provides the obliqueness flags "F" of each "0". The value of the central pixel of the scan window 23 is "0". Since "CP+R=8" (Step S38), step S40 (FIG. 6A) sets "CP+R=8" to the value CP of the central pixel of the scan window 23. Eventually, the value of the peripheral pixels of the pattern data are set each to "8" as shown in FIG. 4B, thereby providing enlarged pattern data of FIG. 4C.

Figure 4D:
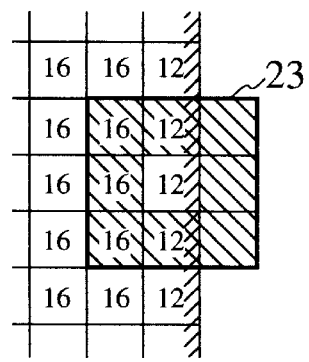
Figure 4E:
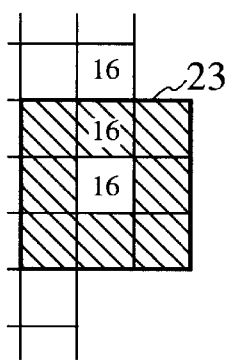
Figure 4F:
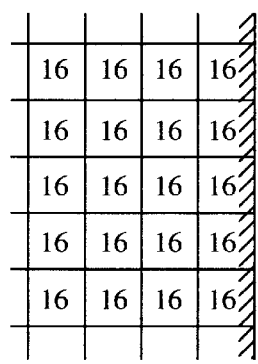
Figure 4G:
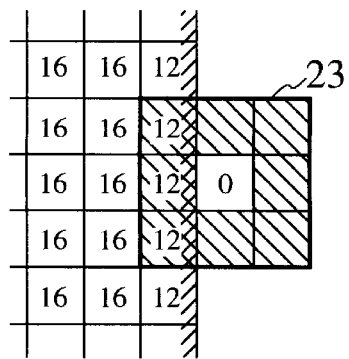
Figure 4H:
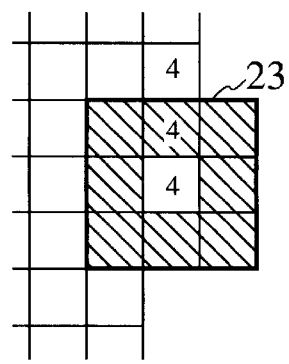
Figure 4I:
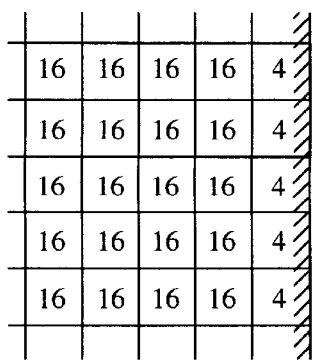

Pattern data of FIG. 4D will be explained. The maximum detector 11 provides a maximum value "E" of 16, and the oblique side detector 12 provides the obliqueness flags "F" of each "0". Since the value CP of the central pixel of the scan window 23 is "12", CP+R=12+8=20>16, and step S39 (FIG. 6A) sets "16" to the value CP of the central pixel of the scan window 23. When the scan window 23 is advanced by one pixel to a position shown in FIG. 4G, the maximum detector 11 provides a maximum value "E" of "12", and the oblique edge detector 12 provides the obliqueness flags "F" of each "0". The value CP of the central pixel of the scan window 23 is "0". Since E+R=12+8=20>16 in step S42 (FIG. 6B), (E+R)−16=(12+8)−16=4 is set to the value CP of the central pixel of the scan window 23 in step S43. Eventually, enlarged pattern data of FIG. 4I is obtained.

Figure 7A:
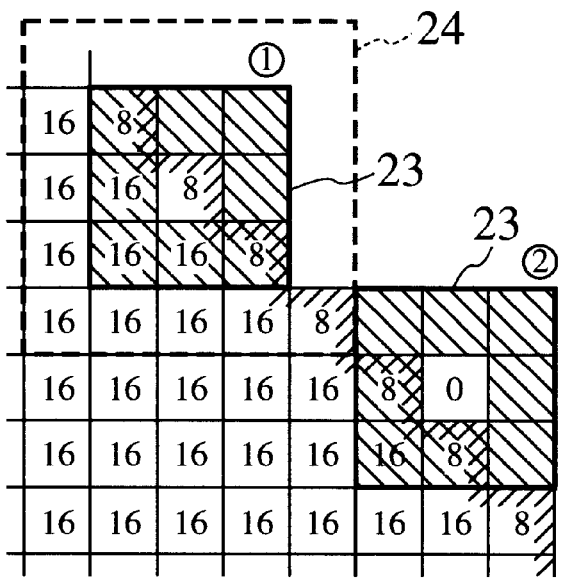
FIGS. 7A and 7B explain a process of shifting a position of an oblique side carried out by the size modification circuit of the present invention.
Figure 7B:
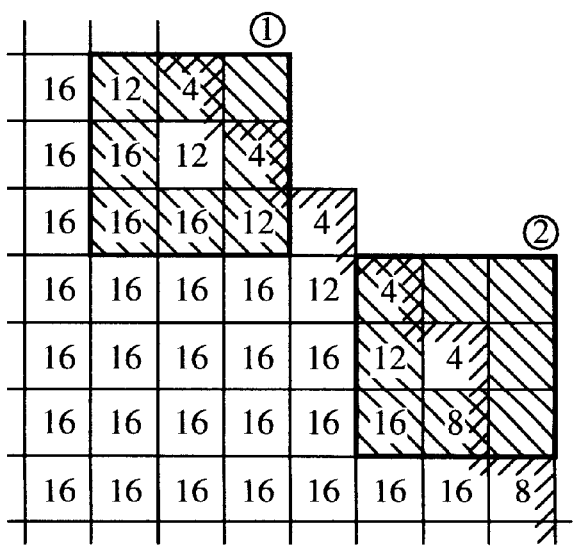

FIGS. 7A and 7B show gradational data containing an oblique side. When the scan window 23 is at a position ① in FIG. 7A, the maximum detector 11 (FIG. 3B) provides maximum values "E" and "G" each of "16", and the oblique side detector 12 provides the obliqueness flags "F" of "1" and "H" of "0". In steps S50 and S51 (FIG. 6C), the CPU 9 (FIG. 3A) specifies a size modification quantity "R" of "8". With the size modification quantity "R" of "8" and the maximum values "E" and "G" of each 16, the lookup table of FIG. 8 provides new size modification quantities "NR (R3 and R5)" of each "4". If, for example, a hypotenuse of a right triangle runs along a diagonal of a pixel to halve the pixel, the value CP of the central pixel of the scan window 23 will have a gradation level of "8". Step S53 refers to the lookup table of FIG. 9 and determines an oblique side adjusting quantity "S" according to the value CP of the central pixel of the scan window 23 and the new size modification quantity "NR (=R3)". Here, the value CP of the central pixel is "8" as shown in FIG. 7A and the new size modification quantity "NR (=R3)" is "4", and therefore, the oblique side adjusting quantity "S" is "12" in FIG. 9. Since the maximum value "E" is "16" in step S54, step S57 sets to the value CP of the central pixel of the scan window 23, the oblique side adjusting quantity "S" of "12" as shown in FIG. 7B.

When the scan window 23 is at a position (②) of FIG. 7A, the value CP of the central pixel is "0" and the new size modification quantity "NR (=R3)" is "4". Accordingly, the oblique side adjusting quantity S is "4" in FIG. 9. As a result, step S57 sets S=4 to the value CP of the central pixel of the scan window 23, to provide an enlarged result of FIG. 7B.

FIGS. 5A and 5B explain the operation of the size modification circuit 77 when the obliqueness flag "H" is "1". Here, let us assume that the CPU 9 specifies a size modification quantity R of "14" in advance. When the scan window 23 is positioned as shown in FIG. 5A, there is an obliqueness flag "F" of "1", and the scan window 23 contains a pixel of gradational data to provide the obliqueness flag "H" of "1". The maximum value "E" of the scan window 23 is "1", and the maximum value "G" of the 5×5 scan window 24 is "12". Step S51 retrieves, according to the assumed size modification quantity "R" of "14", new size modification quantities "R3" of "0" and "R5" of "2" from the lookup table of FIG. 8. If the threshold value "K" is assumed to be "10" as explained above, step S52 determines that the new size modification quantity "R5" of "2" is below the threshold value "K" of "10", to carry out step S53. Since the value CP of the central pixel is "0" and the new size modification quantity "NR (=R3)" is "0", step S53 retrieves an oblique side adjusting quantity "S" of "0" from the lookup table of FIG. 9. Step S54 determines that the maximum value "E" of "12" is below the upper limit of "16", to advance to step S55. As shown in FIG. 5B, step S55 sets the new size modification quantity "R3" of "0" to the central pixel CP of the scan window 23.

Size Reduction Process

When reducing size of patterns constructed with the gradational data provided by the multi-valued pattern development circuit 78, the first pattern data reversing circuit 10 reverses the gradational data.

The reversed pattern data is enlarged through the size enlargement process mentioned above.

Thereafter, the second pattern data reversing circuit 14 reverses the enlarged pattern data again.

Consequently, the size of the pattern constructed with the gradational data is reduced.

Repetitive Process

The processes mentioned above enlarge or reduce the size of pattern constructed with the gradational data by one pixel-size. These processes may enlarge or reduce a pattern constructed with the gradational data by two or more pixel-sizes according to a flowchart of FIG. 10. Step S20 determines whether or not a specified size modification quantity is greater than a pixel-size, and if not, steps S11 to S20 are repeated.

Step S11 determines whether the size of pattern constructed with the gradational data must be enlarged or reduced. If it must be reduced, step S12 reverses the gradational data (a first reversal step).

According to the maximum value detected in a scan window and a preset size modification quantity "R", step S17 refers to the lookup table of FIG. 8 and determines new size modification quantities "NR". Further, step S17 uses the new size modification quantities "NR" and a preset threshold value "K" to determine a new value for the central pixel CP of the scan windows. The value CP of the central pixel is set to the new value, and the size of the pattern constructed with the gradational data is enlarged by a pixel-size.

Step S18 determines whether or not another reversal must be made. If the reversal must be made, step S19 reverses the enlarged gradational data (a second reversal step).

Step S20 determines whether or not the specified size modification quantity is greater than a pixel-size, and if not, step S11 is repeated.

SECOND EMBODIMENT

FIG. 11A shows an outline of pattern inspection equipment according to a second embodiment of the present invention. The equipment has at least a measured data generation unit 16 for generating measured data from actual patterns delineated on a sample 18, and a reference data generation unit 19 for generating reference data used to test if the patterns are sound without faults. The reference data generation unit 19 has a multi-valued pattern development circuit 78 and a fine adjustment circuit 79 connected to the multi-valued pattern development circuit 78. The fine adjustment circuit 79 of the second embodiment differs from that of the first embodiment and is a corner rounding circuit for finely adjusting the roundness of corners in the pattern constructed with the gradational data to match with that of actual pattern. The other arrangements of the second embodiment are substantially the same as those of the first embodiment. Namely, the pattern inspection equipment of the second embodiment has a host computer having a CPU 9. Through a data bus, the CPU 9 is connected to an input unit (not shown) for receiving data and instructions entered by an operator, an output unit (not shown) for providing inspection results, a data memory 91 for storing design data, and a program memory 92 for storing an inspection program. Similar to the first embodiment, the data memory 91 and program memory 92 may be magnetic disk units, optical disk units, magneto-optical disk units, magnetic drum units, magnetic tape units, etc. The measured data generation unit 16 is the same as that of the first embodiment, and therefore, will not be explained again.

The multi-valued pattern development circuit 78 is connected to the corner rounding circuit 79, which is connected to a fault decision circuit 6. The CPU 9 may be connected to external storage units such as magnetic disk units, magnetic tape units, floppy disk drives, etc. And the external storage units can serve as the data memory 91 and the program memory 92. The CPU 9 is also connected to an autoloader controller, a table controller, an autofocus controller, a position circuit, a console, a pattern monitor, a magnetic card unit, a mini-printer, etc. These units are not shown for the sake of simplicity of the drawing.

In response to an instruction from the CPU 9, the design data is sent from the data memory 91 to the multi-valued pattern development circuit 78, which develops it into gradational data expressed in multiple gradation levels. The gradational data is sent to the corner rounding circuit 79, which finely rounds corners in the pattern constructed with the gradational data to meet minute changes in the corners of the actual patterns delineated on the sample 18, which may be a photomask; the minute changes may be ascribable to the variation due to mask manufacturing processes. The corner-rounding data is sent to the fault decision circuit 6. A sensor circuit 5 of the measured data generation unit 16 provides, as measured data, an image of the actual patterns delineated on the photomask substrate 18. The fault decision circuit 6 compares the measured data with the corner-rounded data, to see if the photomask patterns have faults.

Figure 11B:
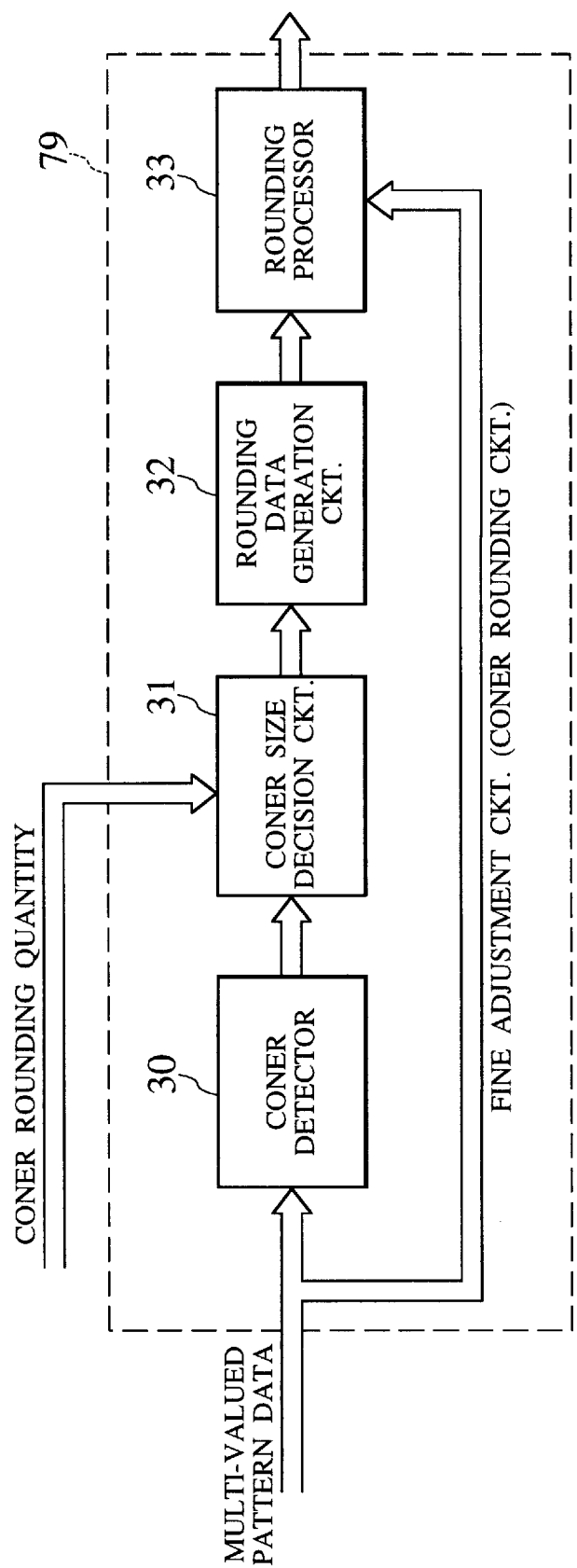
FIG. 11B is a block diagram showing a corner rounding circuit of the equipment of the second embodiment of the present invention.

FIG. 11B shows the details of the corner rounding circuit 79. It has a corner detector 30, a corner size decision circuit 31, a rounding data generation circuit 32, and a rounding processor 33.

The corner detector 30 scans the gradational data with a specified pixel area and converts the pixel area into binary data. Examples of the binary conversion are as follows:

(I) "0" to "0", and "1 or above" to "1"

(II) "15 or below" to "0", and "16" to "1"

According to the binary data, the corner detector 30 detects "a corner likeness" in the pixel area and uses the values of specific pixels to see if there is a corner. If there is a corner, the corner detector 30 finds the type, direction, and convexity/concavity of the corner, and informs the corner size decision circuit 31 of the type, direction, and convexity/concavity of the corner.

The corner size decision circuit 31 determines the size of the corner according to the binary data of specific pixels in the pixel area and the type of the corner. The corner size decision circuit 31 determines whether or not the corner can be rounded according to a corner rounding quantity (a radius of curvature) that is externally specified according to the type of the corner. If the corner can be rounded, the corner size decision circuit 31 provides the rounding data generation circuit 32 with the type, direction, convexity/concavity, and rounding quantity of the corner.

The rounding data generation circuit 32 uses the information from the corner size decision circuit 31 to generate rounding data for the corner in question and supplies the rounding data to the rounding processor 33.

The rounding processor 33 adds or subtracts the rounding data to or from the corresponding gradational data depending on whether the corner in question is convex or concave.

Figure 12:
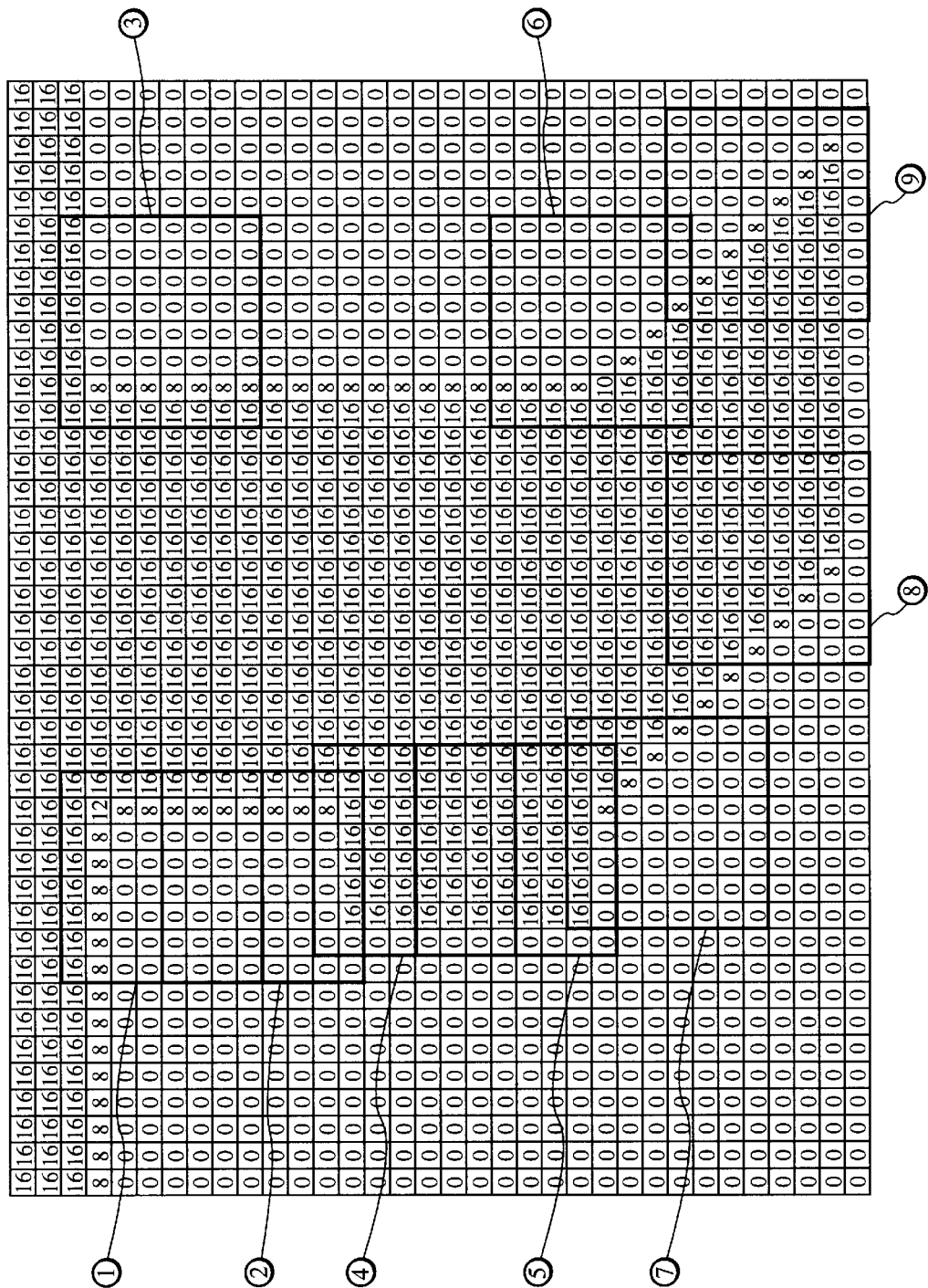
FIG. 12 is a model showing gradational data expressed in multiple gradation levels used for a corner rounding process according to the second embodiment of the present invention.
Figure 13:
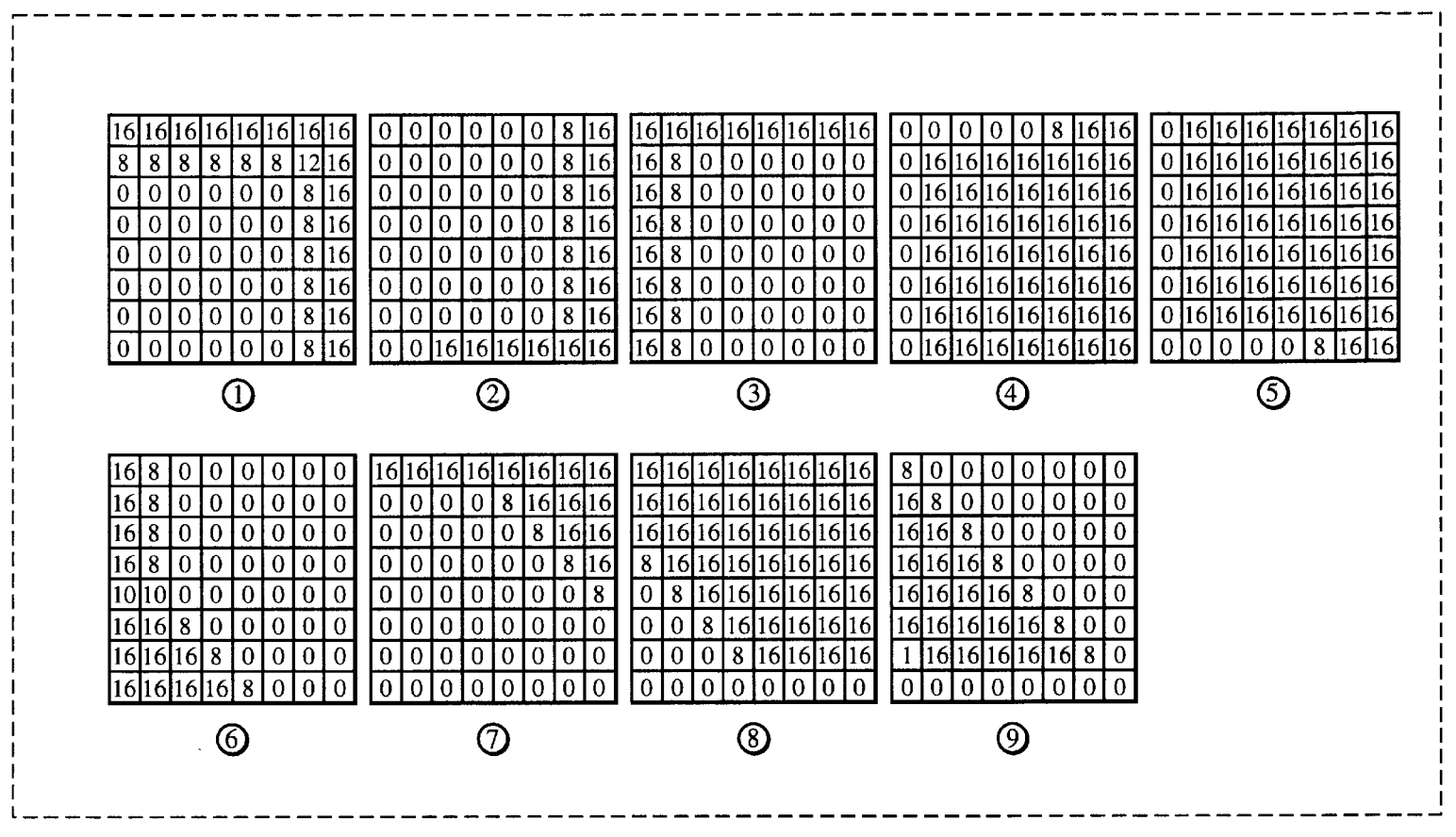
Figure 14:
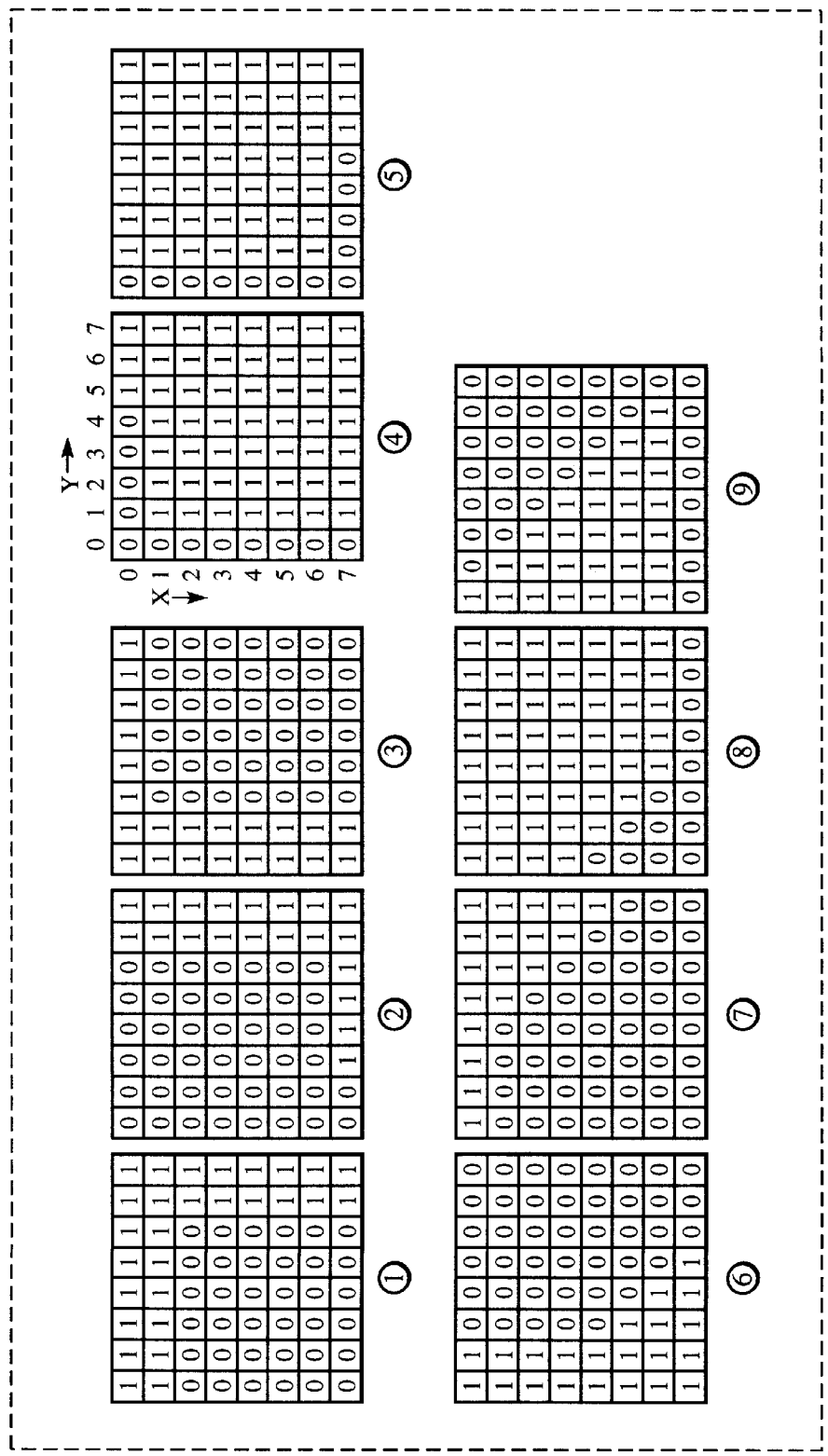
FIG. 14 shows models of binary data prepared from the gradational data of FIG. 13.
Figure 15:
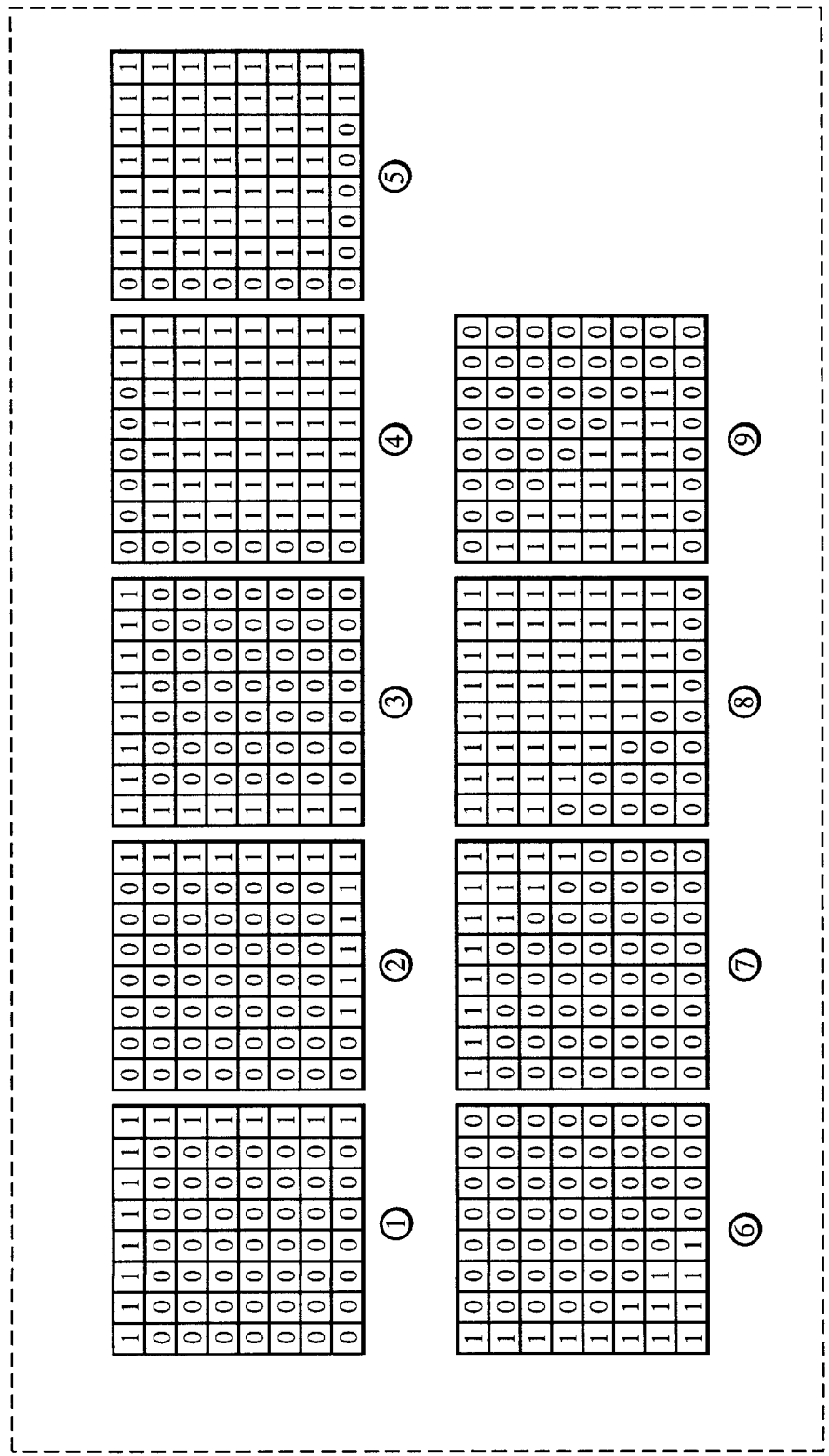
FIG. 15 shows models of binary data transformed from the gradational data of FIG. 13 under different conditions from FIG. 14.

The corner rounding process according to the present invention will be explained with reference to FIGS. 12 to 15. FIG. 12 shows an example of gradational data expressed in multiple gradation levels provided by the multi-valued pattern development circuit 78. An upper limit of gradation level of the gradational data is "16". In the second embodiment, each pixel of the gradational data has a side length of 0.2 $\mu$m. The corner detector 30 successively scans the gradational data with a scan window 22 of 8×8 pixels. In FIG. 12, nine 8×8 scan windows at positions of ① to ⑨ are shown. Some of the 8×8 scan windows at such position as ① and ②, ④ and ⑤, ⑥ and ⑨ are overlapping each other. In each scanning, it is determined whether or not the area in the 8×8 scan window at positions of ① to ⑨ contains a corner. FIG. 13 shows examples of gradational data areas scanned by the 8×8 scan window at positions of ① to ⑨. FIG. 14 shows binary data transformed from the gradational data of FIG. 13 by converting "0" to "0" and "2 or above" to "1" with respect to the 8×8 scan window at positions of ① to ⑨. FIG. 15 shows binary data transformed from the gradational data of FIG. 13 by converting "16 or below" to "0", and "16" to "1" with respect to the 8×8 scan window at positions of ① to ⑨. The binary data of FIG. 14 is used to test a convex corner, and the binary data of FIG. 15 a concave corner. The type, convexity/concavity, direction, and size of a corner are determined as follows:

$$((0,0), (0,1), (1,0), (1,1)) \Rightarrow (0,0,0,1) \quad (1)$$
$$((0,0), (0,1), (1,0), (1,1)) \Rightarrow (1,1,1,0) \quad (2)$$
$$((0,2), (2,0), (3,1), (1,3)) \Rightarrow (0,0,1,1) \quad (3)$$
$$(2,2) \Rightarrow (1) \quad (4)$$
$$((3,0), (0,3), (3,3)) \Rightarrow (0,0,1) \quad (5)$$
$$((4,0), (0,4), (4,1), (1,4), (4,4)) \Rightarrow (0,0,1,1,1) \quad (6)$$
$$((5,0), (0,5), (5,1), (1,5), (5,5)) \Rightarrow (0,0,1,1,1) \quad (7)$$

The expression (1) is for a convex corner, and the expression (2) for a concave corner. The 8×8 scan window at position of ④ of FIG. 14 will be explained as an example.

(a) The corner detector 30 checks the expressions (1) and (2) to see if binary data in the pixels (x, y) of the left side of each expression agree with the conditional values of the right side thereof. Since the 8×8 scan window at position of ④ of FIG. 14 meets the expression (1), the corner detector 30 detects a convex corner likeness. The expression (3) is used to detect the type of the corner. The gradational data of the pixels (2, 1) and (1, 2) of the 8×8 scan window at position of ④ is used to determine that it is a 90-degree convex corner. At the same time, the direction of the corner is found.

The corner detector 30 informs the corner size decision circuit 31 of the 90-degree convex corner and the direction thereof. The corner size decision circuit 31 determines whether or not the size of the corner is sufficient to round the same according to a corner rounding quantity that is externally specified according to the type of the corner. The corner size decision circuit 31 also uses the binary data of FIG. 15 prepared by the corner detector 30, when determining the possibility of rounding the corner. The expressions (4) to (7) are sequentially checked one after another to see if the values of the pixels (x, y) of the left side thereof meet the conditions of the right side thereof. According to the conditions met, the size of the corner is determined. The size of the corner will be any one of 2-pixel, 3-pixel, 4-pixel, and 5-pixel corners corresponding to the expressions (4) to (7), respectively. The corner of the 8×8 scan window at position of ④ of FIG. 14 makes the left and right sides of each of the expressions (4) to (6) agree with each other. However, it makes the left and right sides of the expression (7) disagree with each other. It is determined, therefore, that the corner in question is the 4-pixel corner. Since the side length of a pixel is 0.2 $\mu$m, it is determined that the corner may be rounded up to a curvature radius of 0.8 $\mu$m.

(c) If the eternally-specified corner rounding quantity (curvature radius) for the 90-degree convex corner is 0.5 $\mu$m, the maximum possible curvature radius of the corner of the 8×8 scan window at position of ④ of FIG. 14 is above the specified rounding quantity. Accordingly, the specified curvature radius of 0.5 $\mu$m is used to round the corner. If the maximum possible radius determined by the corner size decision circuit 31 is below the specified rounding quantity, the value determined by the corner size decision circuit 31 is used to round the corner. With respect to other 8×8 scan windows at positions of ① to ③ and ⑤ to ⑨, the same corner rounding processes are executed.

Figure 16:
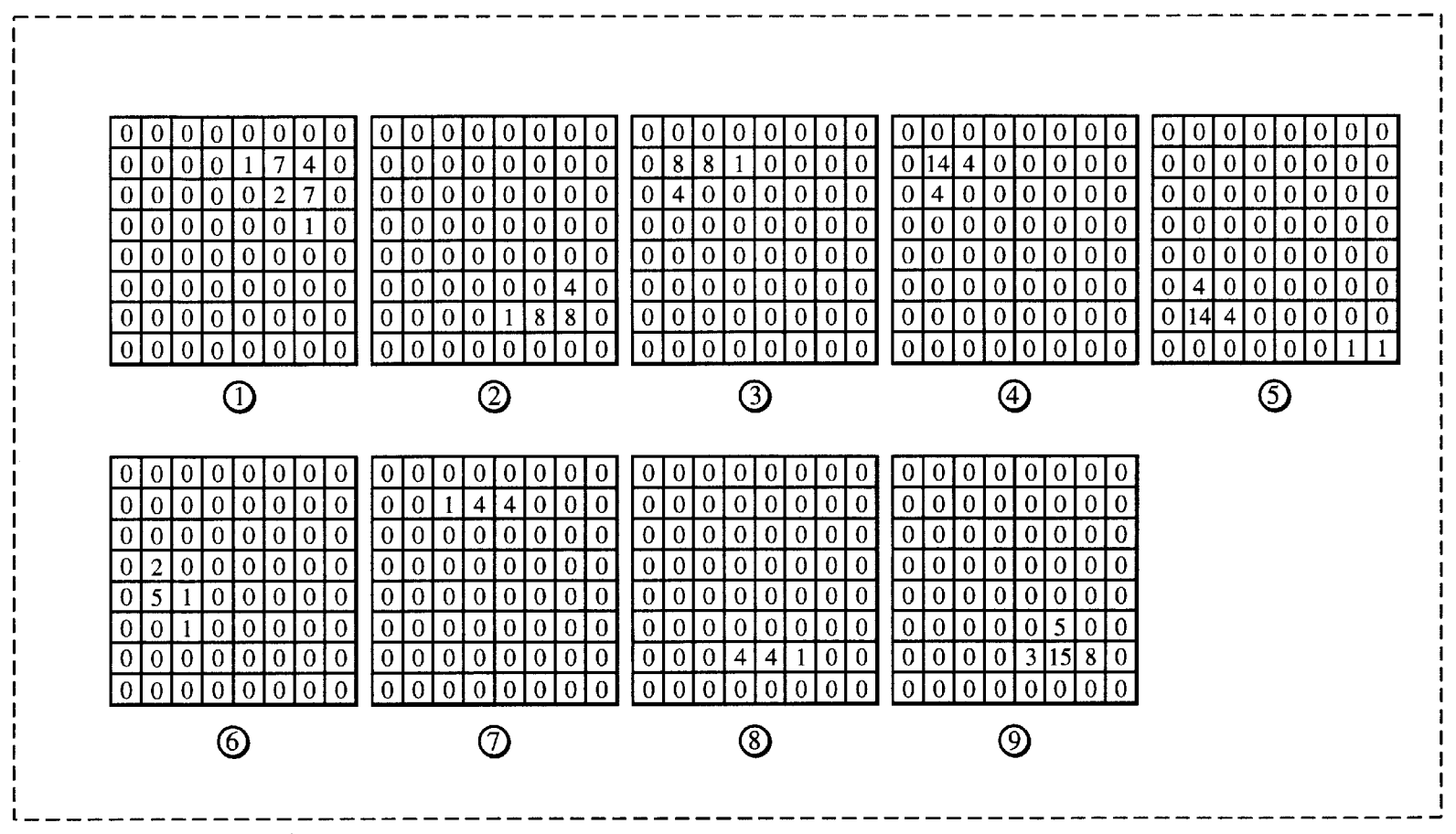
Figure 17:
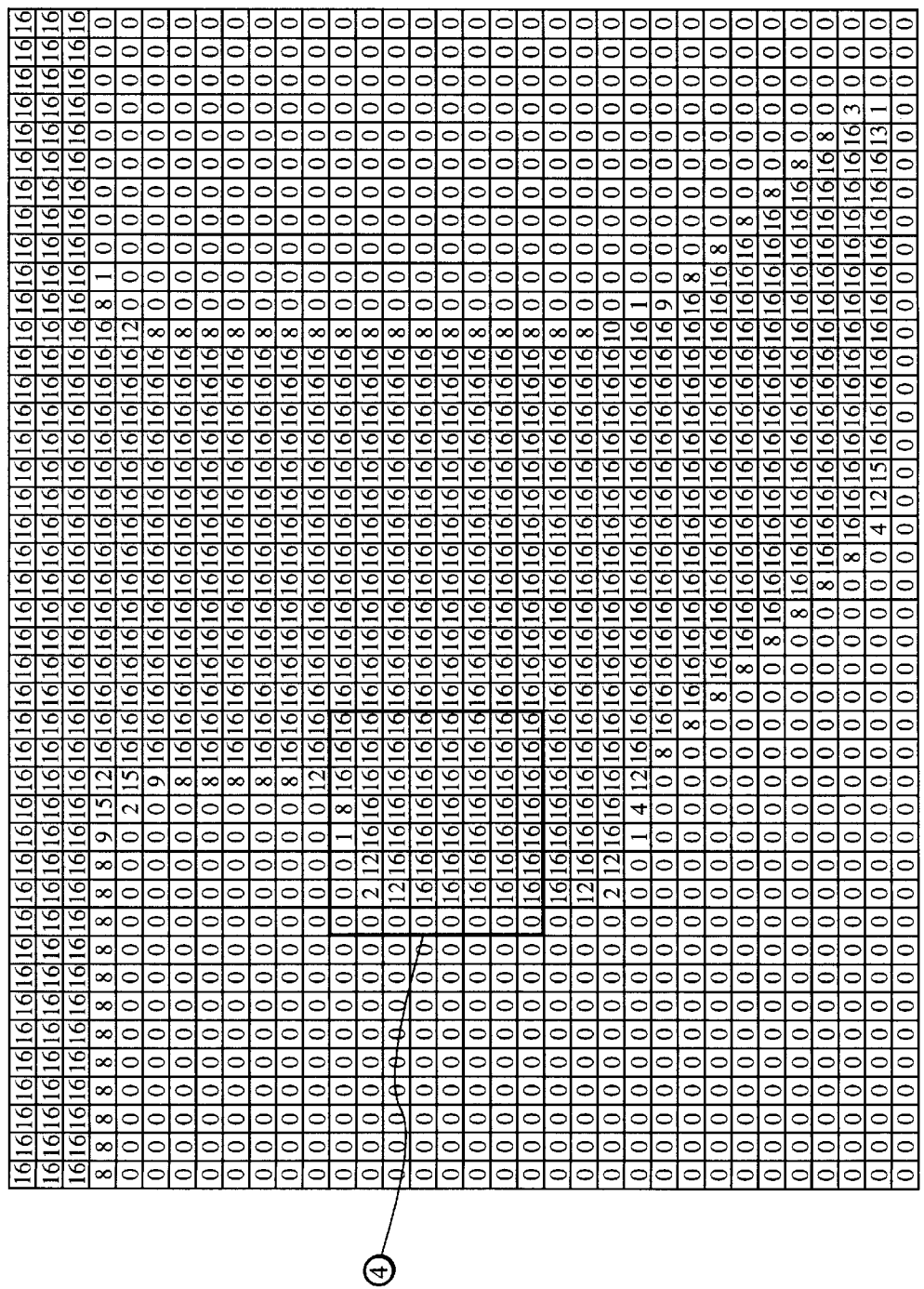
FIG. 17 is a model of gradational data calculated with the gradational data of FIG. 12 and the rounding data of FIG. 16.

The corner size decision circuit 31 informs the rounding data generation circuit 32 of the 90-degree convex corner, the direction thereof, and the corner rounding quantity therefor. The rounding data generation circuit 32 uses these pieces of information to obtain rounding data of FIG. 16 for 8×8 scan windows at positions of ① to ⑨. This rounding data is prepared in advance according to a radius of curvature and a geometrical shape. Namely, for a given radius of curvature, gradational data serving as rounding data is prepared in advance according to the ratio of a rounded area to a pixel area. The rounding processor 33 uses the rounding data and corner information from the rounding data generation circuit 32, to round the original gradational data provided by the multi-valued pattern development circuit 78. If the convexity/concavity information tells that the corner is convex, the rounding data is subtracted from the original gradational data. If the convexity/concavity information tells that the corner is concave, the rounding data is added to the original gradational data, when rounding the original gradational data. More precisely, if the corner is convex, the rounding processor 33 subtracts the rounding data of FIG. 16 from the original gradational data of FIG. 12, and if the corner is concave, adds the rounding data of FIG. 16 to the original data of FIG. 12, to thereby provide new gradational data of FIG. 17. In FIG. 17, only the 8×8 scan window at position of ④ is shown, but similar new gradational data can be obtained for other 8×8 scan windows at positions of ① to ③ and ⑤ to ⑨. If the rounding process makes any pixel value above the upper limit of gradation level or below the lower limit thereof, the pixel value is set to the upper or lower limit.

Storage Medium Readable by Computer, for Storing Program

A program for realizing the pattern inspection of any one of the first and second embodiments is stored in a storage medium readably by computer. The program stored in the storage medium is read by the host computer into the program memory 92 (FIGS. 3A and 11A). A program for achieving the pattern inspection method of the first embodiment stored in the program memory 92 is executed by the multi-valued pattern development circuit 78, size modification circuit 77, etc., under the control of the CPU 9. A program for achieving the pattern inspection method of the second embodiment stored in the program memory 92 is executed by the multi-valued pattern development circuit 78, corner rounding circuit 79, etc., under the control of the CPU 9. The storage medium may be a semiconductor memory like a RAM or ROM, a magnetic disk, an optical disk, a magneto-optic disk, a magnetic tape, or any other capable of storing programs.

Figure 18:
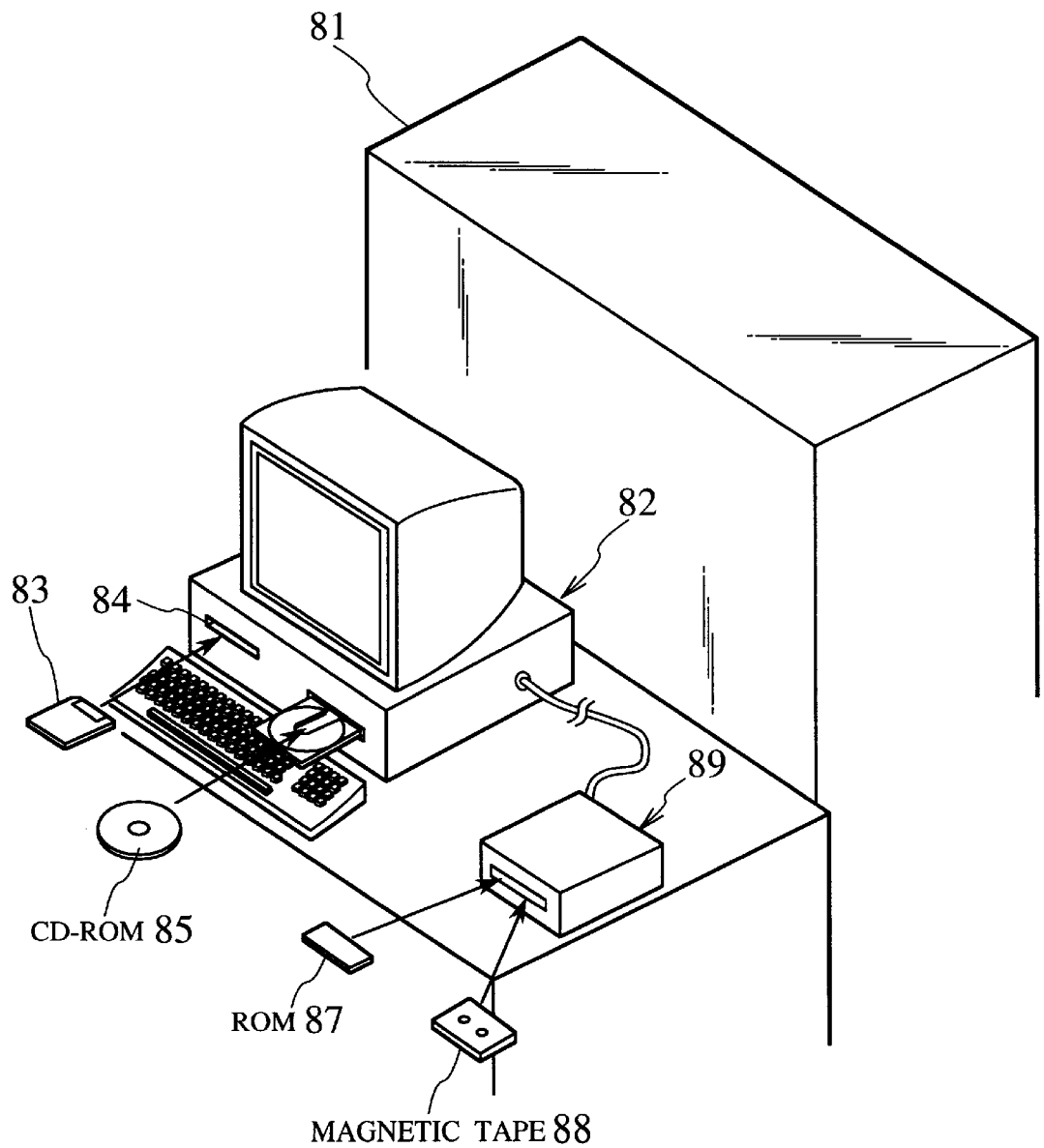
FIG. 18 is a perspective view schematically showing pattern inspection equipment according to the present invention.

FIG. 18 is a perspective view showing pattern inspection equipment according to the present invention. The equipment has a main controller 82 and an inspection chamber 81. The main controller 82 incorporates a host computer. The inspection chamber 81 incorporates the measured data generation unit 16 including the optical image acquiring system (2, 71, 1, 4) of FIGS. 3A and 11A. The main controller 82 incorporates the reference data generation unit 17 (FIG. 3A) or 19 (FIG. 11A). The main controller 82 further includes a floppy disk drive 84 and an optical disk drive 86. The floppy disk drive 84 receives a floppy disk 83 through an insertion slot and reads the same to install a pattern inspection program stored in the floppy disk 83 to the host computer. The optical disk drive 86 receives a CD-ROM 85 through an insertion slot and reads the same to install a pattern inspection program stored in the CD-ROM 85 to the host computer. The main controller 82 may be connected to a drive unit 89 to use a ROM 87, or a magnetic cassette tape 88, to store a pattern inspection program.

Various modifications will become possible for those skilled in the art after receiving the teachings of the present disclosure without departing from the scope thereof.

What is claimed is:

1. Pattern inspection equipment comprising:
   a measured data generation unit configured to generate measured data from patterns that have been delineated on a sample according to design data; and
   a reference data generation unit configured to generate reference data being used to inspect the patterns on the sample, the reference data generation unit having:
      a multi-valued pattern development circuit configured to develop the design data of the pattern into gradational data expressed in multiple gradation levels; and
   a size modification circuit configured to finely adjust pattern edges in the multi-level gradational data by shifting the side of patterns constructed with the gradational data according to a maximum value detected in a specified area in the gradational data, the size modification circuit comprising:
      a first pattern data reversing circuit connected to an input end of the size modification circuit, configured to reverse the gradational data;
      a maximum detector connected to the first pattern data reversing circuit, configured to detect a maximum value in a specified area;
      a pattern enlarger connected to the first pattern data reversing circuit and maximum detector; and
      a second pattern data reversing circuit connected to the pattern enlarger, configured to reverse the output of the pattern enlarger; and
   a fault decision circuit configured to compare the measured data with the reference data.

2. Pattern inspection equipment comprising:
   a measured data generation unit configured to generate measured data from patterns that have been delineated on a sample according to design data; and
   a reference data generation unit configured to generate reference data used to inspect the patterns, the reference data generation unit having:
      a multi-valued pattern development circuit configured to develop the design data into gradational data expressed in multiple gradation levels; and
      a size modification circuit configured to detect an oblique side in the gradational data and to finely adjust pattern edges in the multi-level gradational data by shifting the side of patterns constructed with the gradational data according to a maximum value detected in a specified area in the gradational data, the size modification circuit comprises:
         a first pattern data reversing circuit connected to an input end of the size modification circuit, configured to reverse the gradational data;
         a maximum detector connected to the first pattern data reversing circuit, configured to detect a maximum value in a specified area;
         an oblique side detector connected to the first pattern data reversing circuit, configured to detect an oblique side;
         a pattern enlarger connected to the first pattern data reversing circuit, maximum detector, and oblique side detector; and
         a second pattern data reversing circuit connected to the pattern enlarger, configured to reverse the output of the pattern enlarger; and
   a fault decision circuit configured to compare the measured data with the reference data.

3. Pattern inspection equipment comprising:
   a measured data generation unit configured to generate measured data from patterns that have been delineated on a sample according to design data; and
   a reference data generation unit configured to generate reference data being used to inspect the patterns on the sample, the reference data generation unit having:

a multi-valued pattern development circuit configured to develop the design data into gradational data expressed in non-binary multiple gradation levels having a maximum level of 4n, where n is a positive integer equal to or larger than one;

a fine adjustment circuit configured to finely adjust pattern edges of the pattern expressed by the design data, by a process employing the gradational data expressed in the non-binary multiple gradation levels, wherein the fine adjustment circuit modifies a size of the patterns by changing edge positions of the patterns constructed with the gradational data; and a fault decision circuit configured to compare the measured data with the reference data being adjusted by the fine adjustment circuit;

wherein the fine adjustment circuit is a corner rounding circuit configured to round corners of patterns constructed with the gradational data, the corner rounding circuit having:

at least a corner detector configured to convert the gradational data into binary data and to detect the corners of patterns constructed with the gradational data according to the binary data;

a corner size decision circuit configured to decide the size of each of the corners according to the binary data;

a rounding data generation circuit configured to generate rounding data for the corners according to the information provided by the corner size decision circuit; and a rounding processor configured to round the corners according to the rounding data and the gradational data.

4. A method for inspecting patterns, comprising the steps of:

(a) developing design data used to delineate the patterns on a sample into gradational data expressed in multiple gradation levels;

(b) finely adjusting edges of patterns constructed with the gradational data by detecting a maximum value in a specified area in the gradational data and modifying sizes of the patterns so as to generate reference data, the adjusting step further comprising:

a first reversing step of determining whether or not the gradational data must be enlarged or reduced, and if it must be reduced, reversing the gradational data;

detecting a maximum value in a specified area in the gradational data;

referring to a lookup table according to the maximum value and a given size modification quantity and determining a new value to be set to the central pixel of the specified area;

setting the new value to the central pixel of the specified area to modify a size of a pattern constructed with the gradational data; and a second reversing step of reversing the new value if the gradational data has been reversed by the first inversion step;

(c) generating measured data from actual patterns delineated on the sample; and (d) comparing the measured data with the reference data.

5. A method for inspecting patterns, comprising the steps of:

(a) developing design data used to delineate the patterns on a sample into gradational data expressed in multiple gradation levels;

(b) finely adjusting edges of patterns constructed with the gradational data by detecting a maximum value in a specified area in the gradational data, detecting an oblique side in the pattern, and modifying sizes of patterns so as to generate reference data, the adjusting step further comprises:

detecting an inclination of an oblique side;

referring to a given lookup table according to the maximum value and a preset size modification quantity and determining a new size modification quantity;

referring to the new size modification quantity and a given threshold value, to determine a new value to be set to the central pixel including the oblique side; and setting the new value to the central pixel including the oblique side and shifting the position of the oblique side;

(c) generating measured data from actual patterns delineated on the sample; and (d) comparing the measured data with the reference data.

6. A method for inspecting patterns, comprising the steps of:

(a) a developing design data used to delineate patterns on a sample into gradational data expressed in non-binary, multiple gradation levels having a maximum level of 4n, where n is a positive integer equal to or larger than one;

(b) finely adjusting edges of the patterns by a process employing the gradational data expressed in the non-binary multiple gradation levels and generating reference data, wherein the finely adjusting step modifies a size of the patterns by changing edge positions of the patterns constructed with the gradational data;

(c) generating measured data from actual patterns delineated on the sample; and (d) comparing the measured data with the reference data and the edges of the pattern of the reference data being adjusted by the finely adjusting step, wherein the finely adjusting step includes a corner rounding step of rounding corners in the pattern constructed with the gradational data, the corner rounding step including the steps of:

converting the gradational data into binary data;

detecting corners in the pattern constructed with the gradational data according to the binary data;

deciding the size of each of the corners according to the binary data;

generating rounding data for the corners according to information provided by the deciding step; and rounding the corners according to the rounding data and gradational data.

* * * * *